(12) United States Patent
Ogai

(10) Patent No.: US 8,086,537 B2
(45) Date of Patent: Dec. 27, 2011

(54) DISTRIBUTION SYSTEM OF CONTENTS EMBEDDING LICENSE MACHINE ID

(75) Inventor: Yoichiro Ogai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1652 days.

(21) Appl. No.: 10/387,805

(22) Filed: Mar. 13, 2003

(65) Prior Publication Data

US 2003/0177073 A1    Sep. 18, 2003

(30) Foreign Application Priority Data

Mar. 15, 2002 (JP) ................. 2002-072125
Mar. 15, 2002 (JP) ................. 2002-072854

(51) Int. Cl.
*H04K 1/00* (2006.01)
*H04L 9/00* (2006.01)
(52) U.S. Cl. ........... 705/59; 705/51; 709/219; 726/29
(58) Field of Classification Search ............ 705/59, 705/51; 709/219; 726/29
See application file for complete search history.

(56) References Cited

U.S. PATENT DOCUMENTS

| | | | |
|---|---|---|---|
| 5,629,980 A | 5/1997 | Stefik et al. | |
| 6,170,060 B1* | 1/2001 | Mott et al. | 726/29 |
| 6,385,596 B1* | 5/2002 | Wiser et al. | 705/51 |
| 6,687,802 B1 | 2/2004 | Kori et al. | |
| 6,735,699 B1 | 5/2004 | Sasaki et al. | |
| 6,915,427 B2 | 7/2005 | Maruyama et al. | |
| 7,159,089 B2 | 1/2007 | Kori et al. | |
| 2001/0044838 A1* | 11/2001 | Iida | 709/219 |
| 2001/0051928 A1 | 12/2001 | Brody | |
| 2002/0002541 A1 | 1/2002 | Williams | |
| 2002/0065781 A1 | 5/2002 | Hillegass et al. | |
| 2002/0138291 A1* | 9/2002 | Vaidyanathan et al. | 705/1 |
| 2004/0059938 A1 | 3/2004 | Hughes et al. | |
| 2005/0102240 A1 | 5/2005 | Misra et al. | |
| 2006/0259432 A1* | 11/2006 | Ishibashi et al. | 705/52 |
| 2008/0065566 A1* | 3/2008 | Eglen et al. | 705/400 |

(Continued)

FOREIGN PATENT DOCUMENTS

EP    1 017 001    7/2000

(Continued)

OTHER PUBLICATIONS

Notice of Reason of Rejection, mailed Feb. 3, 2009 for JP Appeal No. 2006-4920, JP Patent Application No. 2002-072125.

(Continued)

*Primary Examiner* — Charles C Agwumezie
(74) *Attorney, Agent, or Firm* — Morrison & Foerster LLP

(57) ABSTRACT

A server apparatus operates a content sale site for selling a digital content and connects communicably via a communication network to a client apparatus which may purchase a digital content for use in an electronic music apparatus. In the server apparatus, a communicating section communicates with the client apparatus for receiving therefrom order information specifying a digital content to be purchased, and machine ID information designating machine IDs of electronic music apparatuses which are intended to use the specified digital content. A licensing section embeds the received machine ID information in the digital content specified by the client apparatus so as to license the specified digital content to the electronic music apparatuses designated by the client apparatus. A providing section provides the digital content embedded with the machine ID information to the client apparatus such that the provided digital content is made available exclusively by the designated electronic musical apparatuses according to the embedded machine ID information.

4 Claims, 15 Drawing Sheets

U.S. PATENT DOCUMENTS

2008/0295182 A1 11/2008 Ogai
2009/0049157 A1* 2/2009 Kimura et al. ............... 709/219

FOREIGN PATENT DOCUMENTS

| | | |
|---|---|---|
| JP | 10-40639 | 2/1998 |
| JP | 10-322676 | 12/1998 |
| JP | 11-259964 | 9/1999 |
| JP | 11-283325 A | 10/1999 |
| JP | 2000-90039 | 3/2000 |
| JP | 2000-099010 | 4/2000 |
| JP | 2000-163488 | 6/2000 |
| JP | 2000-195162 | 7/2000 |
| JP | 2001-109625 | 4/2001 |
| JP | 2001-136163 | 5/2001 |
| JP | 2001-258009 | 9/2001 |
| JP | 2001-519562 | 10/2001 |
| JP | 2001-324985 | 11/2001 |
| JP | 2001-344433 | 12/2001 |
| JP | 2002-041399 A | 2/2002 |
| JP | 2002-051037 A | 2/2002 |
| WO | WO-02/01331 | 1/2002 |

OTHER PUBLICATIONS

Notification of Reasons for Refusal mailed Mar. 31, 2009, for JP Patent Application No. 2006-081020, three pages, with English Translation.

European Summons to Attend Oral Proceedings mailed Jun. 30, 2011, for EP Application No. 06118458.6, 11 pages.

* cited by examiner

FIG.4A
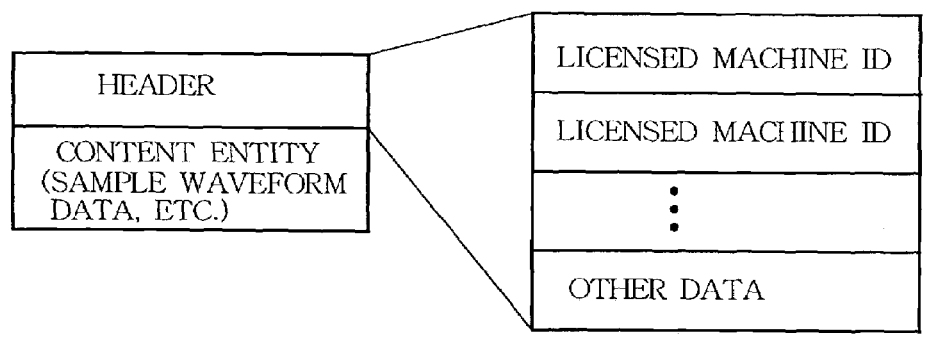
FIG.4B
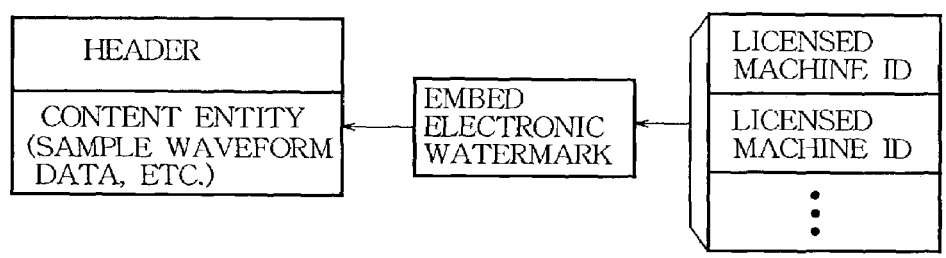
FIG.5
| CONTENT NAME | LICENSED MACHINE ID | NICKNAME |
|---|---|---|
| AAAA | ※ ○○○○ | ×××× |
| | SM ↗ △△△△ | □□□□ |
| BBBB | ※ ○○○○ | ×××× |
| | ◎◎◎◎ | ▽▽▽▽ |

DISTRIBUTION SYSTEM OF CONTENTS EMBEDDING LICENSE MACHINE ID

BACKGROUND OF THE INVENTION

1. Industrial Field of Utilization

The present invention relates to a content sale and purchase system for electronic music apparatuses designed to prevent unauthorized use of the digital contents on sale via a communication network such as the Internet.

The present invention also relates to a content usage system which is capable of using, in a restrictive manner, digital contents on sale through computer networks while preventing the digital contents from being used in an unauthorized manner.

2. Prior Art

Digital contents such as sample music waveform data for example usable on electronic musical apparatuses such as samplers may be purchased in a CD-ROM at a real store or in a manner by which content is downloaded from a content sale site on a communication network such as the Internet. The content thus purchased is usable not only on electronic musical apparatuowned by a particular user but also on electronic musical apparatus owned by other users. If one user has a plurality of electronic musical apparatuses, the user may utilize any of these machines for use of the content.

However, this availability of the purchased content on many electronic musical apparatuses makes it easy to make the unauthorized duplication thereof, which is obviously undesirable with respect to copyright protection. This is a first problem.

For copyright protection, the inventor proposes in this application a method in which usage license agreement information is attached to each piece of purchased content to allow only the licensed electronic musical apparatuses for the use of the content. However, if a licensed electronic musical apparatus is not enough in content processing capability, the above-mentioned method may present a second problem that the content concerned cannot be fully used.

For example, a content usage system with two or more samplers connected to a network as electronic musical apparatuses may become disabled if one of the samplers has a limited performance in the number of soundings, the number of multi-parts, or the memory size for example relative to the content concerned. If this happens, the processing must carried out by a second sampler. If this second sampler is not licensed, however, this content cannot be fully used by this system.

SUMMARY OF THE INVENTION

It is therefore a first object of the present invention to provide a content sale and purchase system designed to protect the copyright of digital contents by preventing the same from being used in an unauthorized manner on any other electronic music apparatuses than those licensed for usage of the contents and to facilitate user operations at content purchase and use by embedding a usage license ID into the content usable on electronic music apparatuses at the time of content purchase, the usage license ID being indicative of a plurality of electronic music apparatuses licensed for the use of the content.

Further, it is a second object of the present invention to provide a content usage system that can allow a group of electronic musical apparatus to use digital contents even if the group includes both of non-licensed members and licensed members for content usage.

In a first aspect of the invention, a server apparatus operates a content sale site for selling a digital content and connects communicably via a communication network to a client apparatus which may purchase a digital content for use in an electronic music apparatus. The server apparatus comprises a communicating section communicable with the client apparatus for receiving therefrom order information specifying a digital content to be purchased, and machine ID information designating machine IDs of electronic music apparatuses which are intended to use the specified digital content, a licensing section that embeds the received machine ID information in the digital content specified by the client apparatus so as to license the specified digital content to the electronic music apparatuses designated by the client apparatus, and a providing section that provides the digital content embedded with the machine ID information to the client apparatus such that the provided digital content is made available exclusively by the designated electronic musical apparatuses according to the embedded machine ID information. Preferably, the server apparatus further comprises a charging section that charges the client apparatus for the specified digital content provided to the client apparatus, and a registering section that registers the embedded machine ID information in connection with the specified digital content, wherein the charging section reduces a charge to the client apparatus when the client apparatus sends new order information specifying the same digital content accompanied by new machine ID information designating machine IDs and when the machine IDs contained in the new machine ID information overlap with the machine IDs contained in the registered machine ID information. Alternatively, the communicating section notifies the client apparatus of a double order when the client apparatus sends new order information specifying the same digital content accompanied by new machine ID information designating machine IDs and when the machine IDs contained in the new machine ID information overlap with the machine IDs contained in the registered machine ID information.

An inventive client apparatus is capable of purchasing a digital content for use in an electronic music apparatus from a content sale site operated by a server apparatus communicably connected to the client apparatus via a communication network. The client apparatus comprises a transmitting section communicable with the server apparatus for transmitting thereto order information specifying a digital content to be purchased, and machine ID information designating machine IDs of electronic music apparatuses which are intended to use the specified digital content, such that the server apparatus embeds the transmitted machine ID information in the specified digital content so as to license the specified digital content to the designated electronic music apparatuses, a receiving section that receives the digital content embedded with the machine ID information from the server apparatus, and a distributing section that can distribute the received digital content to the designated electronic music apparatuses such that the distributed digital content is made available exclusively by the designated electronic musical apparatuses according to the embedded machine ID information. Preferably, the transmitting section automatically collects the machine IDs of the electronic music apparatuses when the electronic music apparatuses are connected to the client apparatus, and transmits the machine ID information containing the collected machine IDs to the server apparatus.

An inventive storage medium stores a digital content used in an electronic music apparatus, wherein the digital content has a data format comprising a header specifying the digital content, a data entity of the digital content, and machine ID information embedded in the data format, the machine ID information designating machine IDs of electronic music apparatuses which are licensed to use the digital content, and wherein the digital content is made available exclusively by an electronic music apparatus if a machine ID thereof matches with one of the machine IDs contained in the machine ID information embedded in the digital content. Preferably, the machine ID information is embedded in the header of the data format of the digital content. Alternatively, the machine ID information is embedded in the data entity of the digital content as an electronic watermark.

An inventive electronic music apparatus has a self machine ID and is capable of using a digital content which is stored in a storage medium and which embeds therein machine ID information designating machine IDs of electronic music apparatuses licensed to use the digital content. The inventive electronic music apparatus comprises a processing section that is enabled to process a digital content for use, a specifying section that specifies a digital content to be used and retrieves the specified digital content from the storage medium, and an enabling section operative only when the self machine ID matches with one of the machine IDs designated by the machine ID information embedded in the specified digital content, for enabling the processing section to process the specified digital content for use. Preferably, the processing section has a working memory for use in the processing of the digital content, and the enabling section operates when the self machine ID matches for loading the specified digital content retrieved from the storage medium into the working memory to thereby enable the processing section. In such a case, the enabling section operates when the self machine ID does not match for loading the specified digital content retrieved from the storage medium into the working memory while adding a disable flag to the specified digital content, the disable flag being effective to allow an instant use of the specified digital content loaded in the working memory, but effective to inhibit other than the instant use. The disable flag is effective to inhibit the processing section to store back the specified digital content from the working memory to another storage medium for a secondary use of the specified digital content. Expediently, the enabling section allows the processing section to store the specified digital content in another storage medium with the disable flag being reserved to the specified digital content.

An inventive program is provided for use in a server apparatus operating a content sale site for selling a digital content and being communicably connected via a communication network to a client apparatus which may purchase a digital content for use in an electronic music apparatus. The program is executable by the server apparatus for causing the content sale site to perform a method comprising the steps of communicating with the client apparatus to receive therefrom order information specifying a digital content to be purchased, and machine ID information designating machine IDs of electronic music apparatuses which are intended to use the specified digital content, embedding the received machine ID information in the digital content specified by the client apparatus so as to license the specified digital content to the electronic music apparatuses designated by the client apparatus, and providing the digital content embedded with the machine ID information to the client apparatus such that the provided digital content is made available exclusively by the designated electronic musical apparatuses according to the embedded machine ID information.

In a second aspect of the invention, a digital content usage system is applicable to a content usage apparatus for use of a digital content containing a license machine ID. The system comprises an acquiring part that acquires a unique machine ID of a content usage apparatus which intends to use the digital content, a detecting part that detects the license machine ID from the digital content to be used, a comparing part that compares the acquired unique machine ID with the detected license machine ID, and a determining part being operative if the acquired unique machine ID matches with the detected license machine ID for allowing the content usage apparatus to exercise a free use of the digital content, and being operative if the acquired unique machine ID does not match with the detected license machine ID for restricting the content usage apparatus to exercise only a temporary use of the digital content under a time duration. Preferably, the detecting part further detects time information from the digital content, the time information being indicative of the time duration allotted to the digital content, and the determining part restricts the content usage apparatus to exercise a temporary use of the digital content under the time duration indicated by the time information. Preferably, the detecting part further detects status information from the digital content, the status information being indicative of whether the digital content is available for a content usage apparatus having no license machine ID, and the determining part allows the content usage apparatus to exercise a temporary use of the digital content only when the status information indicates that the digital content is available for the content usage apparatus having no license machine ID. Preferably, the determining part operates if the acquired unique machine ID does not match with the detected license machine ID for inhibiting the content usage apparatus from exercising an extended use beyond the temporary use of the digital content, the extended use including copying of the digital content, reserving of the digital content into a storage medium and transferring of the digital content to another content usage apparatus.

Another inventive digital content usage system is applicable to a first content usage apparatus for transfer of a digital content to a second content usage apparatus, the digital content containing machine ID information indicative of license machine IDs. The system comprises a designating part that designates the second content usage apparatus as a destination to which the digital content is transferred from the first content usage apparatus, and that acquires a unique machine ID of the designated second content usage apparatus, a detecting part that detects the license machine IDs from the digital content, a writing part operative when the acquired unique machine ID of the second content usage apparatus is not included in the detected license machine IDs for writing rental information into the digital content, the rental information indicating that the digital content may be subjected to a temporary use under a predetermined limitation, and a transferring part that allows the first content usage apparatus to transfer the digital content written with the rental information to the second content usage apparatus such that the second content usage apparatus can only exercise the temporary use due to the rental information.

A further inventive digital content usage system is applicable to a first content usage apparatus for transfer of a digital content to a second content usage apparatus, the digital content containing machine ID information indicative of license machine IDs. The system comprises a designating part that designates the second content usage apparatus as a destination to which the digital content is transferred from the first content usage apparatus, and that acquires a unique machine ID of the designated second content usage apparatus, a detecting part that detects the license machine IDs from the digital content and further detects status information from the digital content, the status information indicating whether the digital content is available for a temporary use by a content usage apparatus having no license machine ID, and a transferring part operative when the acquired unique machine ID of the second content usage apparatus is not included in the detected license machine IDs and when the status information indicates that the digital content is available for the temporary use, for allowing the first content usage apparatus to transfer the digital content to the second content usage apparatus such that the second content usage apparatus can only exercise the temporary use.

A still further digital content usage system is applicable to a first content usage apparatus having no license machine ID for use of a digital content held in a second content usage apparatus having a license machine ID. The system comprises a retrieving part that retrieves the digital content from the second content usage apparatus having the license machine ID, a detecting part that detects status information from the retrieved digital content, the status information indicating of whether the digital content is available for a content usage apparatus having no license machine ID, a checking part operative when the detected status information indicates that the digital content is available for a content usage apparatus having no license machine ID, for checking whether a connection is established between the first content usage apparatus and the second content usage apparatus, and a determining part responsive to the checking part for allowing the first electronic apparatus to exercise use of the digital content only when the connection is established between the first content usage apparatus and the second content usage apparatus.

An inventive recording medium contains a digital content for use in a content usage apparatus having a unique machine ID, wherein the digital content comprises a data entity of the digital content, a license machine ID for identifying a content usage apparatus allowed to use the digital content, and status information indicative of whether the digital content is available for a temporary use under a time duration by a content usage apparatus having no license machine ID, whereby the content usage apparatus can only exercise the temporary use of the digital content if the status information indicates that the digital content is available for the temporary use even when the unique machine ID does not match with the license machine ID.

Another inventive recording medium contains a digital content for use in a content usage apparatus having a unique machine ID, wherein the digital content comprises a data entity of the digital content, a license machine ID for identifying a content usage apparatus allowed to use the digital content, and time information indicative of a time duration allotted to a temporary use of the digital content, whereby the content usage apparatus can exercise the temporary use of the digital content within the allotted time duration even when the unique machine ID does not match with the license machine ID.

BRIEF DESCRIPTION OF THE DRAWINGS

FIGS. 4A 4B are examples of a storage format of content to be stored in a storage medium on the electronic music apparatus practiced as one embodiment of the invention.

FIG. 5 is one example of a stored content list screen displayed on the electronic music apparatus practiced as one embodiment of the invention.

DETAILED DESCRIPTION OF THE INVENTION

This invention will be described in further detail by way of example with reference to the accompanying drawings. It should be noted that the embodiments described below are illustrative only and therefore various modifications and changes thereto are possible within the scope of the spirit of the present invention.

(System Overview)

Figure 1:
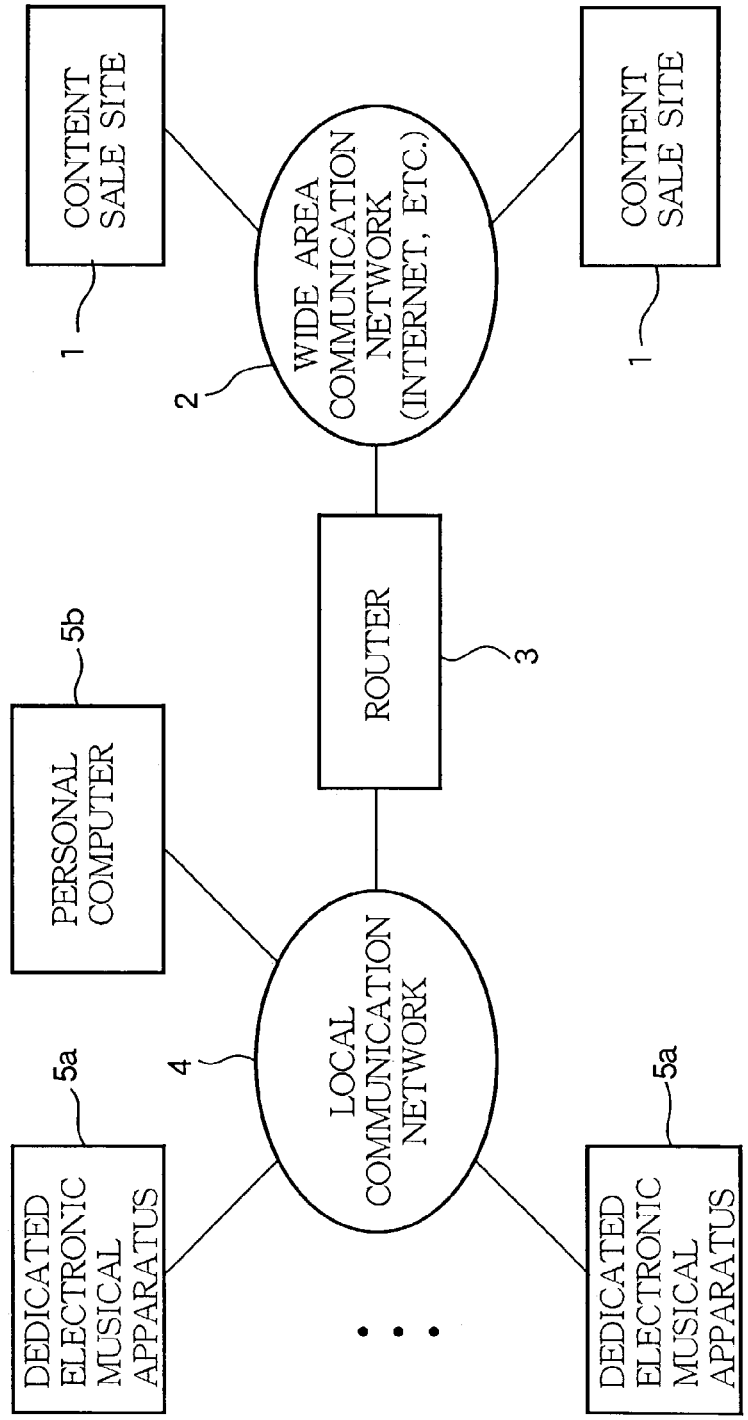
FIG. 1 is a schematic network configuration diagram illustrating a content sale and purchase system practiced as one embodiment of the invention.

Now, referring to FIG. 1, there is shown a schematic network configuration of a content sale and purchase system practiced as one embodiment of the invention. In this example, the system comprises a content sale site 1, a wide area communication network 2 such as the Internet, a relay device (router) 3, a local communication network 4 such as LAN, and a plurality of content usage apparatuses (electronic musical apparatuses) 5. Some or all of content usage apparatuses 5 may function as content purchase apparatuses.

Now, referring to FIG. 1, a content sale and purchase system according to the present invention will be outlined. A particular electronic music apparatus (a content purchase apparatus) among a plurality of electronic music apparatuses (5a, 5b) communicably interconnected via a local communication network 4 registers machine IDs of a plurality of electronic music apparatuses to be licensed for content usage into a content sale site 1, and indicates the electronic music apparatuses to be licensed for the usage of desired content. The content sale site 1 delivers the content embedded with a plurality of licensed machine IDs indicative of the machine IDs of all the specified electronic music apparatuses to the content purchase apparatus, in which the already sold content that has been used by the usage licensed electronic music apparatus is discounted in price. In the delivered content, the licensed machine IDs are embedded in the header part or the entity data part in the form of electronic watermark, the delivered content being usable only on the electronic music apparatuses having these licensed machine IDs.

In detail, the content sale site 1 has the capabilities of delivering such electronic music information (music contents) for use on each of the electronic musical apparatus 5 as sound waveform data (sound data), MIDI data, electronic music note data, ringing melody data, karaoke data, and video data with sound. It should be noted that the content sale site 1 may function as not only a content distribution site dedicated to music information but also as a site for delivering character information such as news and image information such as a standby screen of portable telephone for example. Alternatively, the content sale site 1 may function as a shopping site or an information search site.

The local communication network 4 is constituted by a protocol suited to the transfer of music data. For example, the local communication network 4 is constituted by mLAN (trademark of Yamaha Corporation) based on the IEEE 1394 standard. Alternatively, the local communication network 4 may be constituted by a protocol such as Ether Net (trademark of Fuji Xerox Co., Ltd) or by a plurality of different protocols. For example, mLAN may be used for the realtime transmission of music data while Ether Net may be used for the transmission of files.

The content usage apparatuses 5 include an electronic musical apparatus 5*a* dedicated to the processing of music information and a personal computer (PC) 5*b* having music information processing capabilities. In this system, the content usage apparatuses 5 having the music information processing capabilities such as the dedicated electronic music apparatus 5*a* and the PC 5*b* are generically referred to as "electronic music apparatuses" which include music game machines, karaoke equipment, mobile communication terminals such as mobile phones, sale terminals for selling portable music information storage media, and so on. These electronic music apparatuses each have a unique electronic music apparatus ID (machine ID) and is given a nickname by its user.

In this content sale and purchase system, the "content usage apparatuses" 5 such as the electronic music apparatus 5*a* and the PC 5*b* having music information usage capabilities may function as the content usage apparatuses capable of using of the content sold at the content sale site 1, and the electronic music apparatus ID unique to each apparatus is used for the content usage apparatus ID. Of these electronic music apparatuses 5, the electronic music apparatuses communicable with the content sale site 1 have the capabilities of "a content purchase apparatus", and content embedded with the licensed machine ID may be delivered from the content sale site 1 and may be downloaded by the content purchase apparatus into a storage medium. Other apparatuses than the electronic music apparatuses (including the content purchase apparatus concerned) having the content usage apparatus ID matching the licensed machine ID may access the storage medium storing the licensed machine ID embedded content. However, those which can use the content are only the apparatuses having the IDs matching the licensed machine ID.

It should be noted that, like a general personal computer, the content purchase apparatus may be a machine dedicated to content purchasing which is capable of only receiving the delivery of music content from the content sale site 1, without especially having the music information usage capabilities. In what follows, the content purchase apparatus will be described as also having the capabilities of the electronic music apparatus 5 such as the above-mentioned dedicated electronic music apparatus 5*a* and the PC 5*b*. The content usage apparatuses 5 which may use content purchased from the content sale site 1 include not only the content usage apparatus connected to the local communication network 4 but also other electronic music apparatuses connected individually to the content purchase apparatus and other content usage apparatuses which may use a storage medium in which the machine ID embedded content downloaded by the content purchase apparatus is stored.

(Hardware Configuration of Each Content Usage Apparatus)

Figure 2:
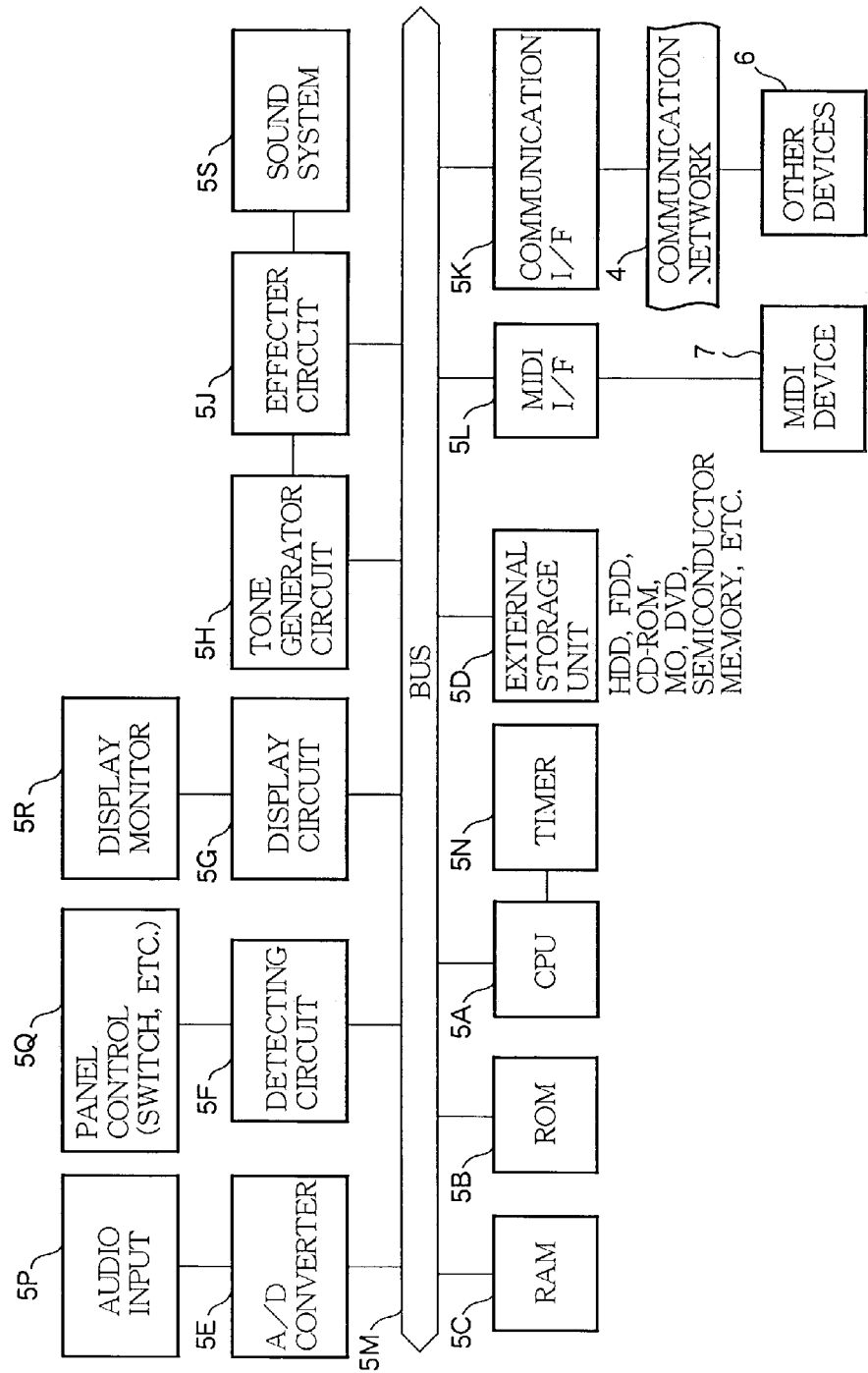
FIG. 2 is a block diagram illustrating a hardware configuration of a content usage apparatus (an electronic music apparatus) practiced as one embodiment of the invention.

Referring to FIG. 2, there is shown a block diagram illustrating a hardware configuration of each content usage apparatus practiced as one embodiment of the invention. In this example, a dedicated electronic musical apparatus such as a sampler is used for the content usage apparatus 5, in which a central processing unit (CPU)5A, a read-only memory (ROM) 5B, a random access memory (RAM) 5C, an external storage unit 5D, an A/D converter 5E, a detecting circuit 5F, a display circuit 5G, a tone generator circuit 5H, an effecter circuit 5J, a communication interface (communication I/F) 5K, and a MIDI interface (MIDI I/F) 5L are interconnected via a bus 5M.

The CPU 5A uses the clock generated by a timer 5N to mainly perform control on music information processing such as sound waveform sampling and various content-associated processing operations including content purchase, use, transfer, and type information rewriting in accordance with a predetermined software program. For this purpose, the ROM 5B stores control programs such as a music information processing program and various other programs associated with content purchase and use, and control parameters. The RAM 5C includes a DRAM, which stores the data and parameters necessary for performing various processing operations and is used as a work area for temporarily storing various kinds of data which are used during processing.

The external storage unit 5D is constituted by a hard disk drive (HDD) or a storage device based on a portable storage medium such as a compact disk read-only memory (CD-ROM), a flexible disk (FD), a magneto-optical disk (MO), a digital versatile disk (DVD), or a semiconductor memory, which stores the music information (content) to be used by the content usage apparatus (5*a*, 5*b*) concerned and content-associated data and a content purchase processing program.

The A/D converter 5E converts an analog audio waveform signal supplied from an audio input source device 5P connected thereto into a digital audio waveform signal to capture it into the system as sound waveform sampling data (sound data).

The detecting circuit 5F detects a setting/control operation performed with a panel control 5Q such as a switch connected thereto and supplies the detected operation into the content usage apparatus 5. The panel control 5Q is a control which is operated on the operator panel to input various kinds of information for setting a operating state of the content usage apparatus 5 concerned and communicating with the content sale site 1. If a PC is user for the electronic musical apparatus, pointing devices such as keyboard and mouse are used as this panel control 5P. The display circuit 5G controls the display data on a display device 5R connected thereto in accordance with instructions supplied from the CPU 5A. The display device 5R includes a display monitor (display unit) and various indicators.

The tone generator circuit 5H is connected to the effecter circuit 5J including a DSP. The effecter circuit 5J is connected to a sound system S including a D/A converting block, an amplifier, and a speaker. These devices 5H, 5J, and 5S form a tone generating block which sounds tones on the basis of the sound data and delivered content inputted and stored in the system. It should be noted that a voice sounding means (not shown) may be disposed on this system as required.

The communication I/F 5K is connected to other devices 6 via the local communication network 4 such as LAN. The other devices 6 include another electronic musical apparatus, a PC, and the relay device (router) 3. Therefore, this electronic musical apparatus may not only communicate with another electronic musical apparatus and a PC but also with the content sale site 1 through the relay circuit (router) 3 and the wide area communication network 2 (such as the Internet). In addition, in this example, the MIDI I/F 31 is connected to another electronic musical apparatus 38 which is able to handle MIDI-formatted music information, thereby transferring MIDI music information.

Although not especially shown, the content sale site 1 is constituted by a server computer having the substantially the same configuration as shown in FIG. 2 and holds, in the mass storage media in its external storage unit such as a hard disk (HD), the electronic music information (content) including sound waveform data (sound data), MIDI data, electronic music note data, ringing melody data, karaoke data, and video data attached with music. Under the control of its CPU and in accordance with a control program such as a content sale processing program stored in its storage device such as ROM, the content sale site 1 executes the content sale processing associated with the sale of content for example. It should be noted that the content sale site 1 need not have the A/D converter 5E, the tone generating means (5H, 5J, and 5S), and the MIDI I/F 5L connected to the audio input block 5P as essential components.

(Content Purchase Screen)

Figure 3:
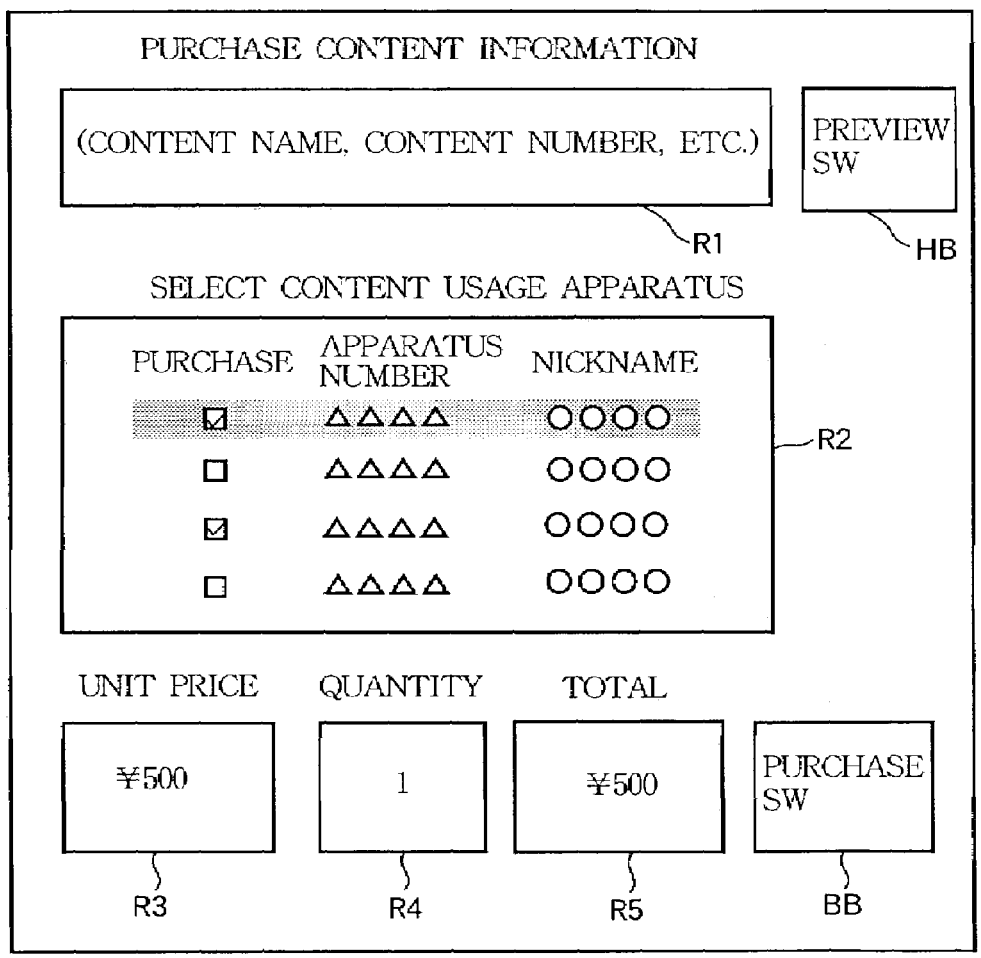
FIG. 3 is one example of a content purchase screen displayed on the electronic music apparatus practiced as one embodiment of the invention.

In the content sale and purchase system practiced as one embodiment of the invention, an electronic music apparatus functions as a content purchase apparatus and, when a predetermined search condition is specified, the content matching the specified search condition is transmitted from a content sale site to be displayed as a search result content list (not shown) on the display device of the electronic music apparatus. When the user selects particular piece of content from the search result content list, a content purchase screen is shown on the display of the electronic music apparatus. FIG. 3 shows an example of this content purchase screen according to one embodiment of the invention.

The content purchase screen displayed on the display device 5R of the electronic music apparatus 5 is a purchase screen associated with one piece of content selected from the above-mentioned search result content list. As shown in FIG. 3, this screen is arranged with a purchase content information display area R1, a content usage apparatus selection display area R2, a purchase order area composed of a unit price display area R3, a quantity display area R4, and a total display area R5, a preview switch (button) HB, and a purchase switch (button) BB.

The purchase content information display area R1 shows such purchase content information for identifying the content concerned as the name (content name) and number (content number) of the content selected by the user as a purchase candidate from the search result content list. When the user operates an operator control 5Q and then presses the preview switch HB, this content may be audibly previewed. It should be noted that the content to be previewed by pressing the preview switch HB is delivered in a streaming manner and not stored in the electronic music apparatus 5, for example.

The content usage apparatus selection display area R2 is used for the selection of an apparatus which uses the content concerned and is composed of a purchase check entry column, a apparatus number column, and a nickname column, nicknames being used for the convenience of user's machine identification. The apparatus number column and the nickname column shows the apparatus numbers and nicknames, side by side, which are registered at the content sale site 1 in advance.

For one piece of content to be shared among a plurality of apparatuses, the usage license of this content must be obtained for each content usage apparatus. In the example shown in FIG. 3, the check boxes on line 1 and line 3 are checked (marked with a check marker) for ordering purchase by the user operation of the operator control 5Q, indicating that the user wants to use the selected content on the apparatuses listed in line 1 and line 3. For the apparatus on line 1, the background is highlighted by halftone or hatching, which is different from other lines, indicating that the content was purchased and licensed on this apparatus before.

The unit price area R3 show the purchase unit price of the content concerned, "Y500" for example. The purchase numeral display areas R4 and R5 show apparatus-corresponding numerals (the quantity display area R4 shows the number of apparatus son which the content concerned is used and the total display area R5 shows a total amount of money) depending on whether the purchase of content concerned is desired, namely, whether the apparatus desiring to purchase the content concerned is checked.

The content sale and purchase system practiced as one embodiment of the invention has a configuration in which the price of the same content as the content already purchased and licensed is totally discounted (free of charge) or partially discounted (reduced price). In the example purchase instruction, the licensed content is provided free of charge and therefore the apparatus on line 1 is not charged for the content, so that only the apparatus on line 3 is charged this time, displaying "1" and "500 yen" on the quantity and total display areas R4 and R5 respectively.

When the user checks the values in the display areas R1 through R5 and then presses the purchase switch BB, the content concerned is downloaded from the content sale site 1 and becomes ready for storage in a storage medium. The storage medium in which the content is stored is a hard disk or a portable storage medium (FD, MO disk or the like) used for the external storage device 5D in this electronic music apparatus 5 or another electronic music apparatus connected to this electronic music apparatus 5. The stored content is usable only on the usage licensed electronic music apparatuses.

(Content Storage Format)

In one embodiment of the invention, the content to be stored in a storage medium is embedded with content usage apparatus IDs indicative of a plurality of usage licensed electronic music apparatuses as "licensed machine IDs" in a predetermined format in order to make the content usage only on the usage licensed electronic music apparatuses. FIG. 4 shows an example of a content storage format according to the invention. The content supplied from the content sale site 1 to be stored in a storage medium of the electronic music apparatus 5 is composed of a header part recorded with header data including content name and number and a content entity part recorded with entity data such as sample waveform data as shown. A plurality of content usage apparatus IDs are embedded in the content in a predetermined format as licensed machine IDs.

In a format example (1) shown in FIG. 4A, the header part is embedded with not only the header data indicative of content name and number but also a plurality of licensed machine IDs indicative of a plurality of electronic music apparatuses (content usage apparatuses) which may use the content concerned. In a format example (2) shown in FIG. 4B, a plurality of licensed machine IDs of the content concerned are embedded in the content entity part as an electronic watermark by an electronic watermark embedding means.

(Stored Content List Display Screen)

In one embodiment of the invention, the content usage licensed status may be checked on each electronic music apparatus by means of the stored content list display screen which shows a list of the content stored in a storage medium. FIG. 5 shows one example of the stored content list display screen according to one embodiment of the invention.

In a particular electronic music apparatus 5, when the content stored in a storage medium, the content being usable on that electronic music apparatus 5, the name of each content concerned (content name), the content usage apparatus ID (licensed machine ID) of the electronic music apparatus licensed for the usage of each content, and the nickname of this electronic music apparatus are retrieved on the basis of the information about the purchased and licensed content stored in this storage medium, and a stored content list display screen is shown on the display 5R.

The stored content list displayed on the screen is formed by the above-mentioned content names, licensed machine IDs, and nicknames as shown in FIG. 5. The electronic music apparatus ID (content usage apparatus ID) set to this electronic music apparatus 5 itself (referred to as "self apparatus" is referred to as "self machine ID". When the licensed machine ID is indicative of the self machine ID, an own apparatus mark SM indicated by "*" is attached to the licensed machine ID, by which the user may confirm that the usage of the content concerned is licensed on this electronic music apparatus.

It should be noted that nicknames are automatically retrieved from other electronic music apparatuses (in each electronic music apparatus, its nickname is registered by the user in advance) connected to this electronic music apparatus 5 along with their content usage apparatus IDs. Otherwise, on this electronic music apparatus 5, the user manually enters the nicknames along with the content usage apparatus IDs. After the content has been stored in a storage medium, the nicknames are retrieved on the basis of the licensed machine IDs embedded in the content and the retrieved nicknames are shown on the stored content list display screen or the like.

(Content Sale and Purchase Main Processing Flow)

Figure 6:
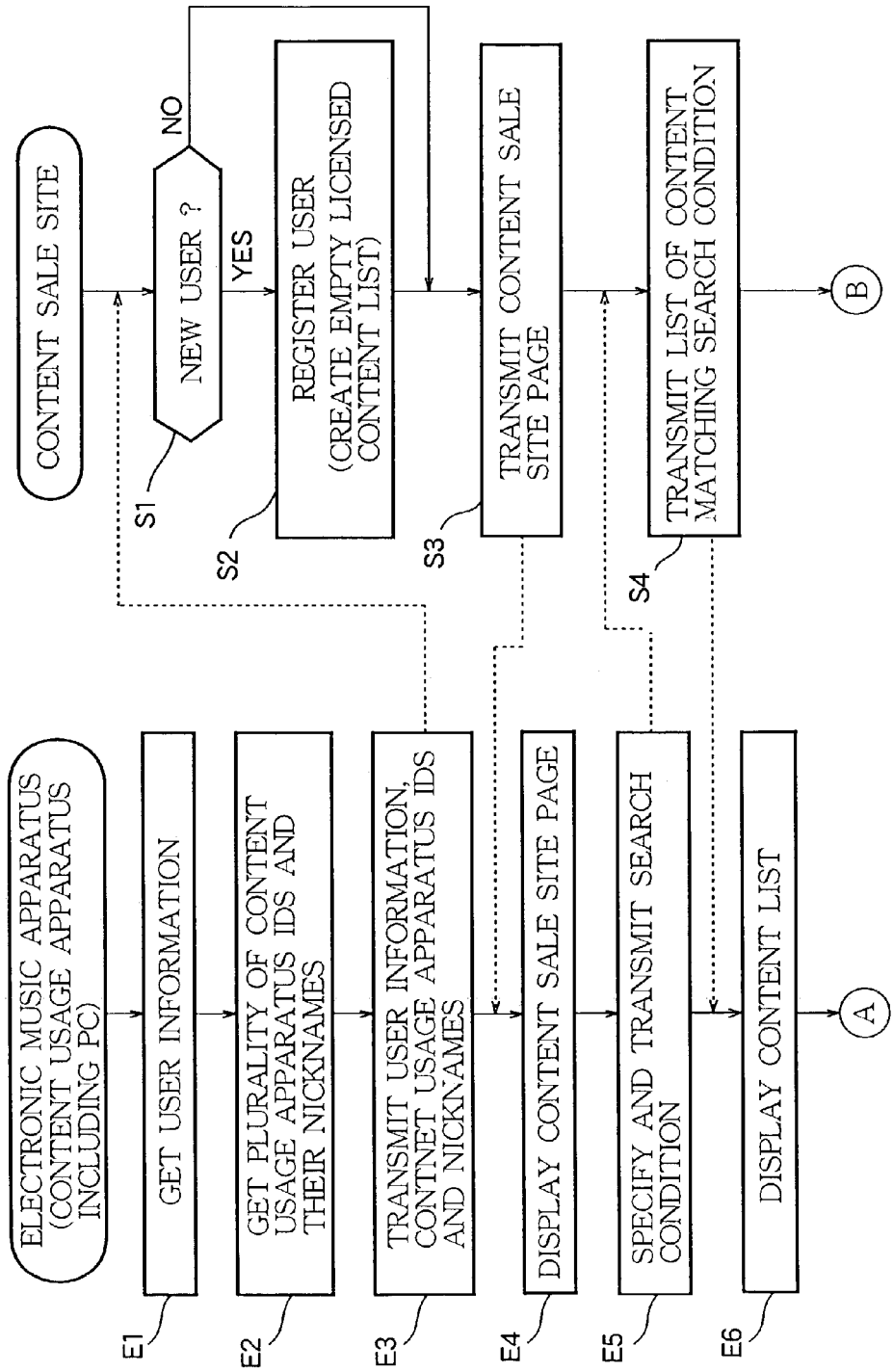
FIG. 6 is a first part (1/3) of a flowchart indicative of a content sale and purchase processing (main processing) practiced as one embodiment of the invention.
Figure 7:
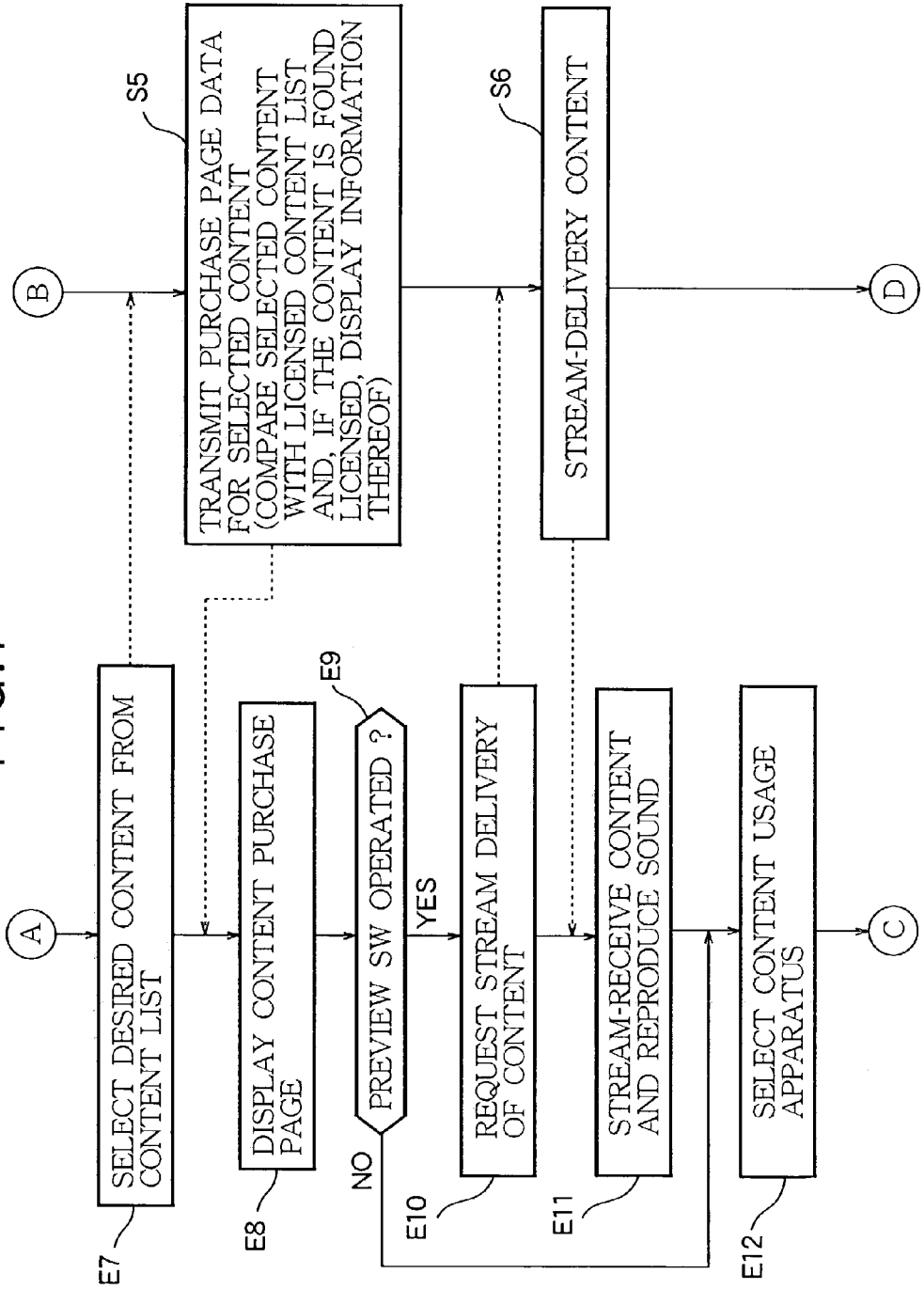
FIG. 7 is a second part (2/3) of the flowchart indicative of a content sale and purchase processing (main processing) practiced as one embodiment of the invention.
Figure 8:
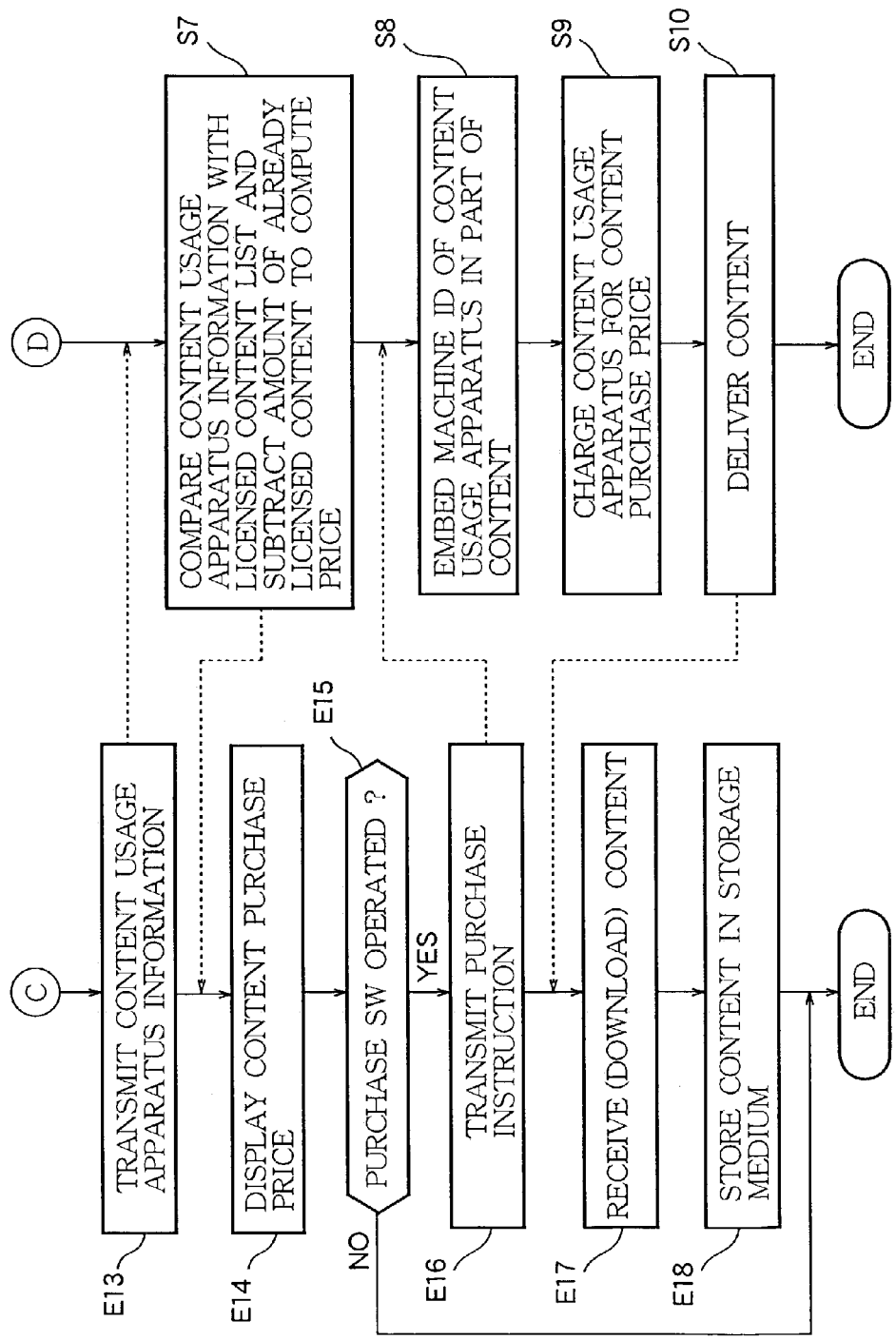
FIG. 8 is a third part (3/3) of the flowchart indicative of a content sale and purchase processing (main processing) practiced as one embodiment of the invention.

In the present content sale and purchase system, in accordance with content sale and purchase programs, an electronic music apparatus communicable with the content sale site 1 among the electronic music apparatuses 5 such as the electronic music apparatus 5a dedicated to music information processing like a sampler and the PC 5b having the like music information processing capabilities may function as a content purchase apparatus to get the content usage apparatus IDs (electronic musical apparatus IDs) and nicknames of a plurality of electronic music apparatuses (including the content purchase apparatus concerned) associated with the electronic music apparatus concerned, thereby accessing the content sale site 1. FIGS. 6 through 8 are flowcharts indicative of the content sale and purchase processing (main processing) according to one embodiment of the invention.

When a particular electronic music apparatus 5 (including the PC 5b accesses the content sale site 1 as a content purchase apparatus, first the electronic music apparatus 5 gets the user information such as the user ID and password associated with the user of the electronic music apparatus concerned in accordance with a content purchase program (step E1: FIG. 6). The user information may be obtained by reading form the electronic music apparatus 5 concerned in which it was registered beforehand or may be obtained every time the access is made.

Next, the electronic music apparatus 5 concerned obtains a plurality of content usage apparatus IDs (electronic music apparatus IDs) and nicknames (step E2). Each content usage apparatus ID and each nickname are registered at each electronic music apparatus (including PC) in advance. These usage machine ID and nickname may be obtained, when accessing the content sale site 1, from the electronic music apparatus 5 (self apparatus) or each electronic music apparatus connected to the electronic music apparatus 5 concerned (self apparatus) or may be obtained every time the access is made.

Next, the electronic music apparatus 5 transmits the user information and the plurality of content usage apparatus IDs and nicknames thus obtained to the content sale site 1 (step E3).

Receiving the user information and the content usage apparatus ID and nickname information from the electronic music apparatus 5, the content sale site 1 first determines in accordance with the content sale processing program whether the accessing user is a new user on the basis of the received information (step S1: FIG. 6). If the accessing user is found not a new user (S1->NO) and if there is any difference between the received content usage apparatus ID and nickname information and the already registered information, the content sale site 1 updates the different information and transmits the page data (for example, a top page) of the content sale site 1 to the electronic music apparatus 5 (step S3).

On the other hand, if the accessing user is found a new user (S1->YES), the content sale site 1 registers the new user and the received information, creates a empty "licensed content list" (step S2), and transmits the page data (S3). It should be noted that the licensed content list is a content licensed apparatus information holding means, for example, which records the content usage apparatus IDs of the content usage licensed electronic music apparatuses as licensed machine IDs for each piece of sold content. For the new user registration, the licensed content list is null data at this point of time.

In response to the reception of the page data from the content sale site 1, the electronic music apparatus 5 displays a content sale site page (not shown) (step E4). When the electronic music apparatus user specifies a content search condition and perform an operation of transmitting the specified information in accordance with the display of this content sale site page, the electronic music apparatus 5 transmits the specified search condition to the content sale site 1 (step E5).

In response, the content sale site 1 performs a content search operation on the basis of the search condition supplied by the electronic music apparatus 5 and returns the list data of the content matching the search condition (step S4), so that the electronic music apparatus 5 displays a search result content list (not shown) on the display 5R on the basis of this list data (step E6). Next, when the user performs operations of specifying and selecting desired content from the displayed content list (step E7: FIG. 7), the content select information corresponding to these operations is transmitted to the content sale site 1.

In response to the reception of the content select information, the content sale site 1 transmits the purchase page data associated with the purchase of the content selected by the electronic music apparatus 5 to the electronic music apparatus 5 concerned on the basis of the registered or updated content usage apparatus IDs and nicknames. (step S5: FIG. 7). In this case, the selected content is compared with the licensed content list and, if the content concerned is found the licensed content, then the licensed information thereof is included in the purchase page data.

On the basis of the purchase page data supplied from the content sale site 1, the electronic music apparatus 5 displays the content purchase page on the display R5 (step E8). The content purchase page displayed at this moment is a content purchase page as shown in FIG. 3 for example (provided that, at this point of time, the purchase column of the content usage apparatus selection display area R2 and the purchase numeral display areas R4 and R5 are blank (namely, these columns are not checked or no numeral is displayed in them). It should be noted that, in the example shown in FIG. 3, line 1 of the content usage apparatus selection display area R2 is displayed in halftone (or hatched) in accordance with the licensed information in the purchase page data, thereby indicating that this content has been licensed for use on the content usage apparatus (electronic music apparatus) listed on line 1.

Next, the electronic music apparatus 5 determines whether the preview switch HB has been operated on the content purchase page (content purchase screen) shown in the display 5R (step E9). If the preview switch HB is found operated (E9->YES), then the electronic music apparatus 5 requests the content sale site 1 for the stream delivery of the content displayed in the purchased content information display area R1 of the content purchase page (step E10). In response, the content sale site 1 stream-delivers the content concerned (step S6) and the electronic music apparatus 5 stream-receives this content, thereby sounding tones based on the received content through the tone generating and sounding circuits 5H, 5J, and 5S (step E11).

If the preview switch HB is found not operated on the electronic music apparatus 5 (E0->NO) or after the stream reception (E10), the user checks the purchase box of a desired line in the content usage apparatus selection display area R2 of the content purchase page to select the desired content usage apparatus (step E12). Every time this select operation is performed, the electronic music apparatus 5 transmits the content usage apparatus information for specifying the selected content usage apparatus (FIG. 3: the content usage apparatus ID on the selected line in the apparatus number column) to the content sale site 1 (step E13: FIG. 8).

Upon reception of the content usage apparatus information, the content sale site 1 compares the content usage apparatus ID based on the content usage apparatus information with the licensed machine ID in the licensed content list to subtract the price from those charged on the already licensed apparatuses, thereby computing the quantity and total amount. The computed numerical information is transmitted to the electronic music apparatus 5 (step S7: FIG. 8).

In response, the electronic music apparatus 5 displays the quantity and content purchase amount in the purchase numeral display areas R4 and R5 respectively (step E14). Thus, the numerals corresponding to the performed select operations are displayed in the purchase numeral display areas R4 and R5 every time a content usage apparatus is selected, so that the user may confirm, from time to time, the content purchase quantity and price corresponding to the selected content usage apparatus.

Next, the electronic music apparatus 5 determines whether the purchase switch BB in the content purchase page has been operated by the user (step E15). If the purchase switch BB is found operated (E15->YES), then the electronic music apparatus 5 transmits the purchase instructing information indicative of the purchase of the content concerned for use on the selected usage apparatus to the content sale site 1 (step E16).

In response, the content sale site 1 embeds all content usage apparatus IDs of the selected usage apparatuses in a part of the content concerned as licensed machine IDs (step S8). The content usage (licensed) machine IDs are embedded in any of the following methods:

(1) the content usage (licensed) machine IDs are embedded in the header part of the content without change (refer to FIG. 4A);
(2) a predetermined computation such as encryption is performed on the content usage (licensed) machine IDs and the resultant IDs are embedded in the header part of the content (refer to FIG. 4A);
(3) the content usage (licensed) machine IDs are embedded in the content entity part as electronic watermark by the electronic watermark embedding means (refer to FIG. 4B); and
(4) a predetermined computation is performed on the content usage (licensed) machine IDs and the resultant IDs are embedded in the content entity part as electronic watermark by the electronic watermark embedding means (refer to FIG. 4B).

Further, the content sale site 1 performs fee charging processing for the content purchase price (step S9) and, at the same time, updates the licensed content list. In the case of a new user, necessary information is written to the empty "licensed content list" created at the time of user registration (S2). Then, the content sale site 1 delivers the content embedded with the content usage apparatus IDs to the electronic music apparatus 5 (step S10), upon which the content sale processing ends at the content sale site 1.

On the other hand, the electronic music apparatus 5 receives (downloads) the content delivered from the content sale site 1 (step E17) and stores the downloaded content in a storage medium such as the HD of the external storage apparatus 5D (step E18). Then, after the content storage processing (E18) or when an end operation is determined (E15) because the purchase switch BB has not been operated (E15->NO), the content purchase processing ends at the electronic music apparatus 5.

("Content Usage Mode 1"=Non-Licensed Content is Not Loaded in DRAM)

Figure 9:
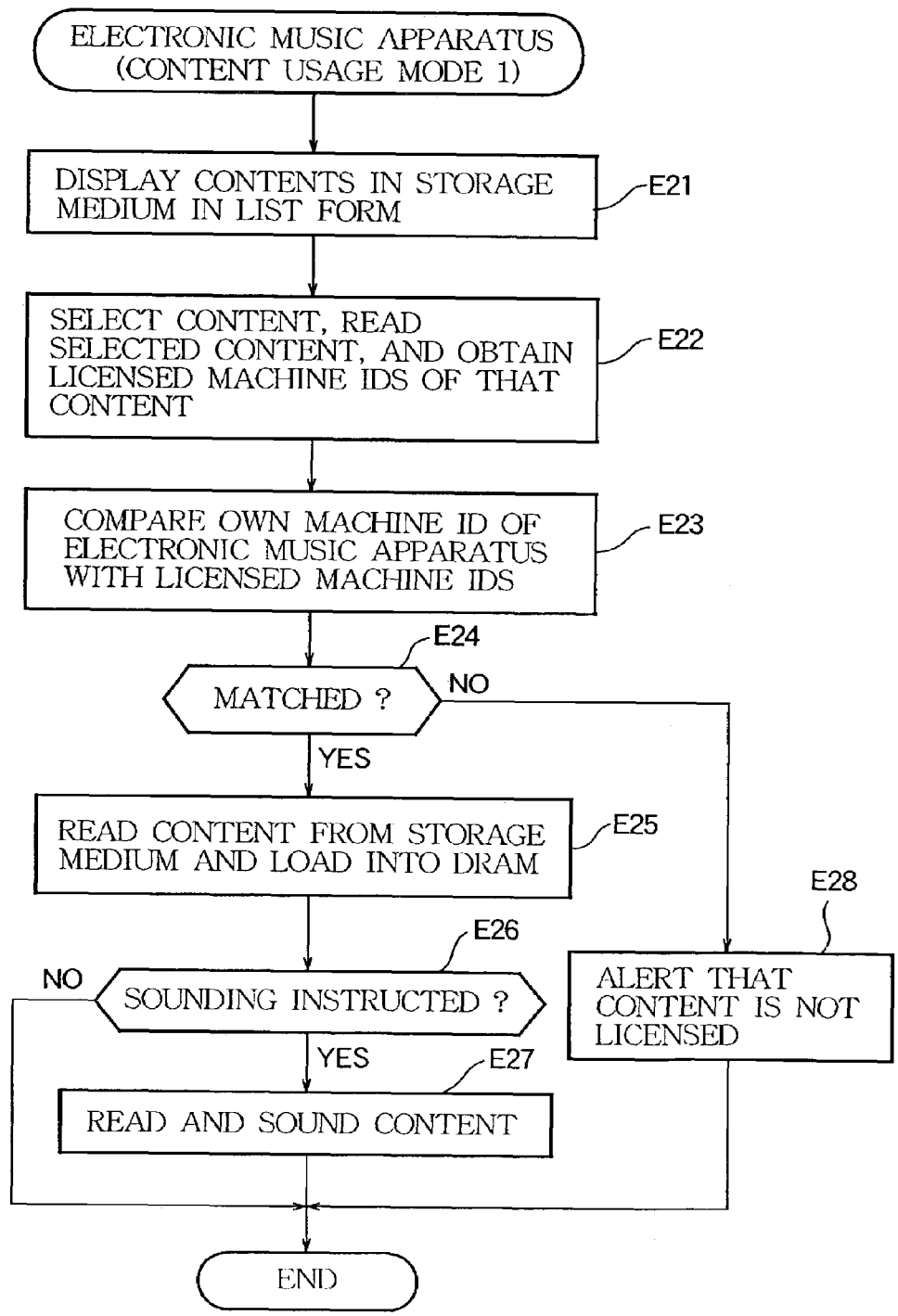
FIG. 9 is a flowchart indicative of "content usage mode 1" processing practiced as one embodiment of the invention.

In one embodiment of the invention, content may be used in one method in which the content not licensed for the electronic music apparatus to be used is not loaded in the main storage apparatus such as DRAM. FIG. 9 shows a flowchart indicative of the processing of "content usage mode 1" according to one embodiment of the invention. In "content usage mode 1", the content not licensed for a particular electronic music apparatus is not loaded in the DRAM (main storage apparatus) of that electronic music apparatus in accordance with a content usage mode 1 processing program.

In a particular electronic music apparatus 5, in order to use the content already stored in a storage medium, the content in the storage medium is first displayed in list on a stored content list screen shown on the display 5R of this electronic music apparatus 5 (step E21). This stored content list screen shows, for each content name, the content usage apparatus ID (licensed machine ID) of the usage licensed electronic music apparatus and its nickname as shown in FIG. 5.

When the user selects a desired content name on the stored content list screen, the electronic music apparatus 5 reads the information about the content corresponding to the selected content name to get a plurality of licensed machine IDs associated with the content (step E22). Further, the electronic music apparatus 5 compares the obtained licensed machine IDs with the content usage apparatus ID namely "self machine ID" (step E23) to determine whether there is a match between them (step E24).

If there is a licensed machine ID of the content concerned matches the self machine ID (E24->YES), the electronic music apparatus 5 reads the content from the storage medium, loads the content in the DRAM (main storage apparatus) 5C (step E25), and determines whether there is a user instruction for sounding the content (step E26).

If a sounding instruction is found (E26->YES), the electronic music apparatus 5 reads the content loaded in the DRAM 5C and, on the basis of the content, sounds the content through the tone generating and sounding blocks 5H, 5J, and 5S (step E27), upon which this "content usage mode 1" processing ends. If no sounding instruction is found (E26->NO), then this processing immediately comes to an end.

On the other hand, if there is no licensed machine ID of the content matching the self machine ID (E24->NO), then the electronic music apparatus 5 does not load the content stored in the storage apparatus into the DRAM 5C, thereby displaying an alert on the display R5 indicative that this content is "the content not licensed" (step E28). In this case, this alert may be given in voice (along with display or voice only) by use of a voice sounding means, not shown. After this alert, the "content usage mode 1" processing comes to an end.

("Content Usage Mode 2"=Non-Licensed Content Cannot be Used if Loaded in DRAM)

Figure 10:
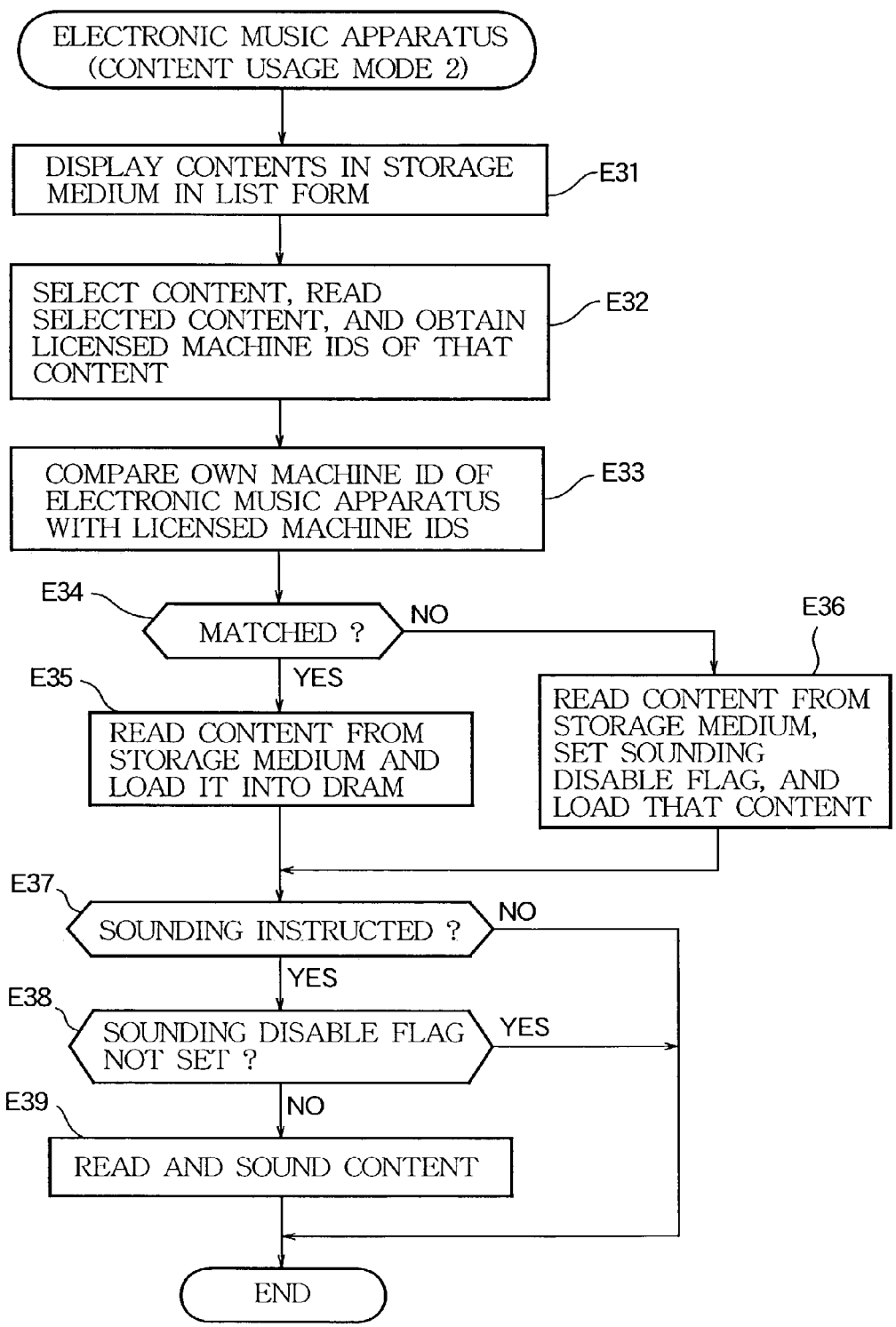
FIG. 10 is a flowchart indicative of "content usage mode 2" processing practiced as one embodiment of the invention.

In one embodiment of the invention, the content stored in a storage medium may be used in another method in which the content not licensed for an electronic music apparatus which wants to use content cannot be used if this content is loaded in the main storage apparatus such as DRAM. FIG. 10 shows a flowchart indicative of the processing of "content usage mode 2" according to one embodiment of the invention. In this "content usage mode 2", any content not licensed for usage on a particular electronic music apparatus may be loaded in the DRAM (main storage apparatus) thereof but is not available for sounding and data manipulation for example.

The first half (steps E31 through E35) of this processing flow are substantially the same as the first half of the processing flow (steps E21 through E25) of "content usage mode 1" shown in FIG. 9, so that the content licensed for usage is directly loaded in the DRAM 5C.

To be more specific, in the "content usage mode 2", in order to use the content stored in the recording medium (5D) in a particular electronic music apparatus 5, the content stored in the storage medium is displayed in list on the stored content list screen (refer to FIG. 5) (E31). When the desired content name is selected on the stored content list screen, the licensed machine IDs of the content concerned are obtained (E32). The obtained licensed machine IDs are compared with the self machine ID (E33) and, if there is any licensed machine ID matching the self machine ID (E34->YES), then the content concerned is loaded from the storage medium into the DRAM 5C (E35).

If there is no match between the licensed machine IDs and the self machine ID as the result of the comparison (E33) (E34->NO), then the electronic music apparatus 5 reads the content concerned from the storage medium and loads it into the DRAM 5C with the sounding disable flag set (step E36).

After the content has been loaded in the DRAM 5C (E35, E36), the electronic music apparatus 5 determines whether the user has instructed the sounding of the content (step E37) and, if the instruction for sounding is not found (E37->NO), this "content usage mode 2" processing immediately comes to an end.

On the other hand, if the instruction for sounding is found (E37->YES), the electronic music apparatus 5 further determines whether the sounding disable flag is set to the content concerned (step S38). If the sounding disable flag is found not set (E38->NO), the electronic music apparatus 5 reads the content from the storage medium, performs the sounding processing corresponding to this content through the tone generating and sounding blocks 5H, 5J, and 5S (step E39), and then ends this "content usage mode 2" processing. If the sounding disable flag is found set (E38->YES), then the electronic music apparatus 5 does not sound the content and immediately ends this processing.

(DRAM-loaded Data Storage Method)

Figure 11:
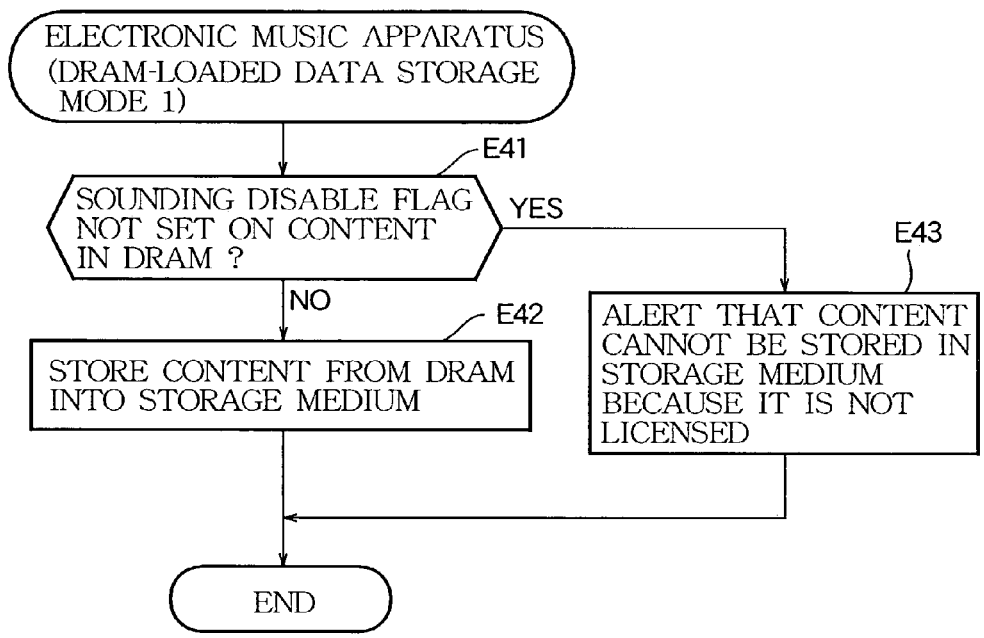
FIG. 11 is a flowchart indicative of "DRAM-loaded data storage mode 1" processing practiced as one embodiment of the invention.
Figure 12:
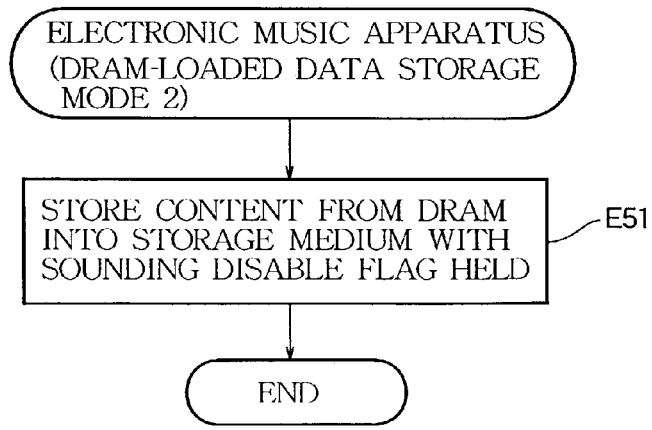
FIG. 12 is a flowchart indicative of "DRAM-loaded data storage mode 2" processing practiced as one embodiment of the invention.

If the content is loaded in the DRAM with the sounding disable flag set in the above-mentioned "content usage mode 2" processing, this content may be stored again in a variety of methods. FIGS. 11 and 12 show flowcharts indicative of two types of DRAM-loaded re-storage procedure examples according to one embodiment of the invention.

In the processing of "DRAM-stored data storing method 1" shown in FIG. 11, when the user wants to store the content loaded in the DRAM 5C of the electronic music apparatus 5 into a storage medium (for example, FD) other than the storage medium (for example, the HD of the electronic music apparatus 5) from which the content has been loaded into the DRAM 5C, it is first determined whether the sounding disable flag is set to the content in the DRAM 5C (step E41).

If the sounding disable flag is found not set (E41->NO), the content in the DRAM 5C is stored in another storage medium (step E42), upon which this "DRAM-stored data storage method 1" processing ends. If the sounding disable flag is found set (E41->YES), the loading of the content into the DRAM 5C is disabled and an alert that the content concerned "cannot be stored in the storage medium because this content is not licensed" is given (step E43), upon which this processing ends.

On the other hand, in "DRAM-stored data storing method 2" shown in FIG. 12, regardless whether the sounding disable flag is set or not on the content loaded in the DRAM 5C, the content is stored in another storage medium without change (step E51). Namely, the content with its sounding disable flag is set is stored in the storage medium concerned with the sounding disable flag held and this processing ends.

(Creating Content and Rewriting its Licensed Machine ID by User)

Figure 13:
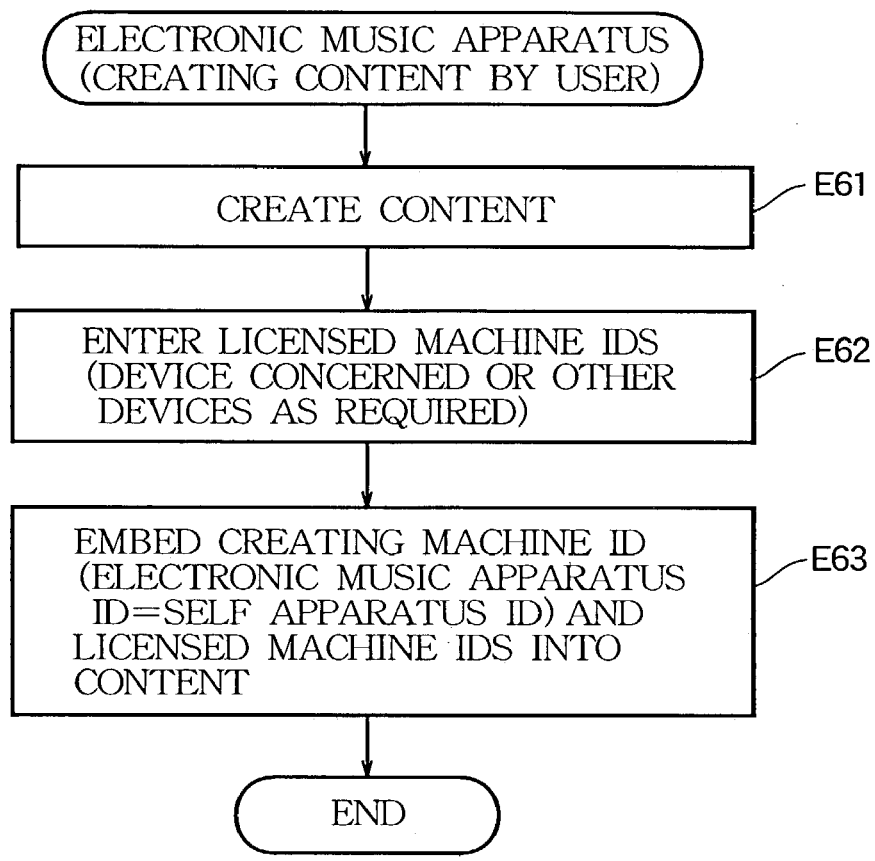
FIG. 13 is a flowchart indicative of "creating content by user" processing practiced as one embodiment of the invention.

In one embodiment of the invention, the user may create content on his own electronic music apparatus in accordance with a content creation processing program. In this case, licensed machine IDs may be embedded also in the content created by the user, so that if a third party gets this content in an unauthorized manner, the content is not usable by the third party, thereby providing copyright protection. FIG. 13 shows a flowchart indicative of "creating content by user" processing according to one embodiment of the invention.

In this "creating content by user" processing, after creating content on the electronic music apparatus 5 (step E61), the user enters a licensed machine ID (step E62). The licensed machine ID entered here is at least the content usage apparatus ID (self machine ID) of the electronic music apparatus 5 concerned, the content usage apparatus IDs (electronic music apparatus IDs) of other electronic music apparatuses may be added as required, and nicknames may be added thereto. It should be noted that these IDs and nicknames may be obtained by reading them from electronic music apparatuses concerned or by manually entering them.

Next, the entered license IDs and a creating machine ID are embedded in the content to be stored in a predetermined storage medium (step E63), upon which this "creating content by user" processing ends. It should be noted that the creating machine ID is the electronic music apparatus ID of the electronic music apparatus 5 on which the user has created content, which is the same as the self machine ID embedded in the licensed machine IDs but is set separately for determining a content providing source.

(Rewriting Licensed Machine IDs)

Figure 14:
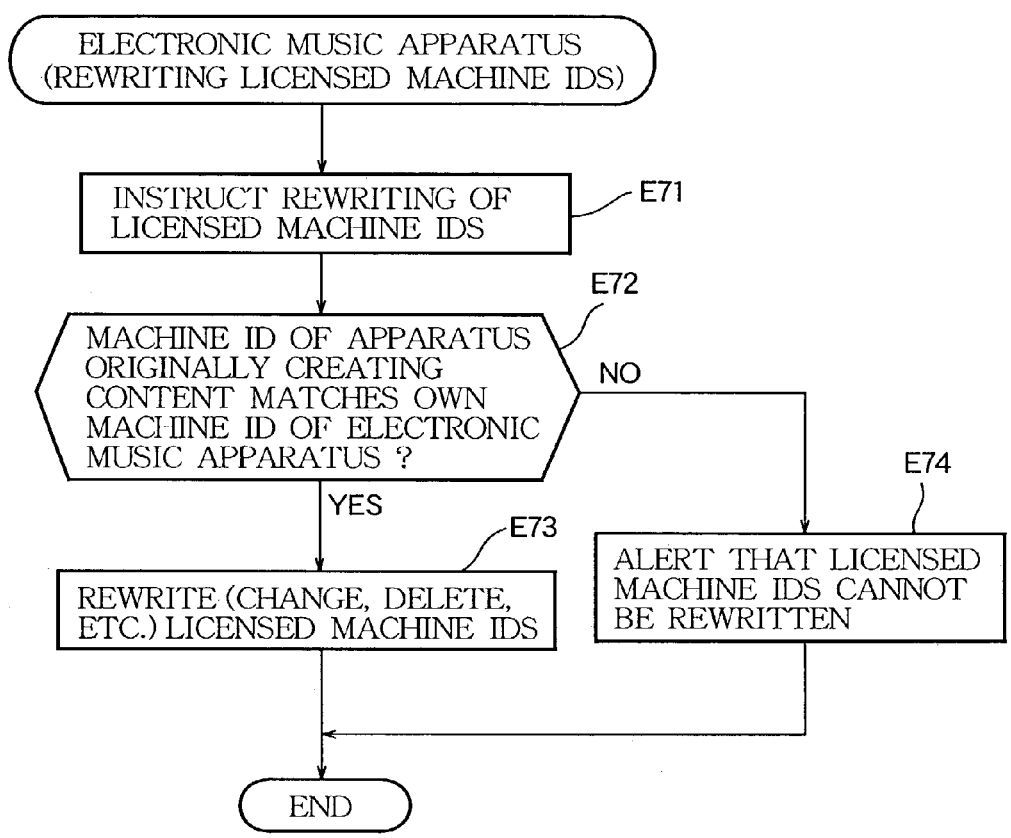
FIG. 14 is a flowchart indicative of "rewriting license machine IDs" processing practiced as one embodiment of the invention.

In one embodiment according to the invention, the content license IDs of the content created by the user on this own on an electronic music apparatus may be edited, for example, change, addition, and deletion, in accordance with a content creating processing program. If all the licensed machine IDs are deleted by this editing, the content becomes usable on all electronic music apparatuses. However, the licensed machine IDs of any content (purchased and licensed from content sale sites for example) other than the user-created content cannot be edited. FIG. 14 shows a flowchart indicative of "rewriting licensed machine IDs" processing according to one embodiment of the invention.

When the electronic music apparatus 5 accesses content stored in a storage medium, a stored content list display screen is shown on the display 5R in the same format as shown in FIG. 5 on the basis of the information about the content stored in the storage medium. In this "rewriting licensed machine IDs" processing, when an operation for instructing the rewriting of the licensed machine IDs of the user-created content is performed (step E71) by setting the content to be rewritten on the stored content when rewriting the licensed machine IDs of the user-created content, the electronic music apparatus 5 determines whether the creating machine ID of the specified content matches the electronic music apparatus ID (self machine ID) of the electronic music apparatus 5 concerned (step E72).

If a match is found between the creating machine ID and the self machine ID (E72->YES), then the editing of the licensed machine IDs such as change, addition, and deletion is enabled by the user operation, the stored content list display screen being changed to the display that corresponds to the results of the editing. When the user checks the results of the edited licensed machine IDs on the screen and performs an operation for instructing the storage thereof, the electronic music apparatus 5 rewrites the licensed machine IDs concerned according to the editing results and stores the resultant licensed machine IDs into a storage medium (step E73), upon which this "rewriting licensed machine IDs" processing ends.

On the other hand, if there is no match between the creating machine ID and the self machine ID (E72->NO), it indicates that the providing source of the content concerned is not the electronic music apparatus 5 concerned, so that an alert "the licensed machine IDs cannot be rewritten" is given in display or voice (step E74), upon which this processing ends without updating the licensed machine IDs.

In the above-mentioned embodiments of the invention, only an example of embedding a plurality of licensed machine IDs into content has been shown. It will be apparent that, if there is only one licensed apparatus, only one licensed machine ID is embedded in content.

For summary, in carrying out the invention and according to one aspect thereof, there is provided a content sale site (1) for electronic music apparatus communicably connected to a content purchase apparatus (5; 5a, 5b) via a communication network (2), comprising: an information communicating means (S1 through S6) for receiving, from an accessing content purchase apparatus (5), machine ID information (content usage apparatus ID) indicative of machine IDs of a plurality of electronic music apparatuses to be licensed for content usage; and a content providing means (S7 through S10) for embedding the machine ID information in content (machine ID embedded content) specified by the content purchase apparatus as licensed machine ID information and supplying the content embedded with the licensed machine ID information to the content purchase apparatus (5). It should be noted that each notation enclosed in parentheses denotes a reference numeral or terminology used in the embodiments to be described later, which holds the same in the following description.

The content sale site for electronic music apparatus (1) according to the invention further comprising: a licensed information holding means (licensed content list) for holding licensed machine ID information indicative of a machine ID of an electronic music apparatus licensed for content usage with respect to sold content; wherein, if the machine ID information matches the licensed machine ID information (content usage apparatus ID) with respect to same sold content as the content specified by the content purchase apparatus (5), the content providing means (S7 through S10) provides the content free of charge or at a discount price (S7, S9). In this configuration of the content sale site for electronic music apparatus, if the machine ID information matches the licensed machine ID information with respect to same sold content as the content specified by the content purchase apparatus, the information communicating means (S1 through S6) notifies the content purchase apparatus (5) that usage license of the content has already been given (S5).

In carrying out the invention and according to another aspect thereof, there is provided a content purchase apparatus (5; 5a, 5b) for electronic music apparatus communicable connected to a content sale site (1) via a communication network (2), comprising: a transmitting means (E2 through E3) for transmitting machine ID information indicative of machine IDs (content usage apparatus IDs) of a plurality of electronic music apparatuses to be licensed for content usage to the content sale site; and a data accepting means (E17) for accepting, from the content sale site, purchase-desired licensed machine ID embedded content (machine ID embedded content) embedded with the machine ID information as licensed machine ID information. In the content purchase apparatus for electronic music apparatus according to the invention, the transmitting means (E2 through E3) automatically gets the machine IDs of the plurality of electronic music apparatuses from electronic music apparatuses (5; 5a, 5b) connected to this content purchase apparatus for electronic music apparatus (5) for electronic music apparatus (E2) and transmits the obtained machine ID information to the content sale site (1).

In carrying out the invention and according still another aspect thereof, there is provided a storage medium (5R) for electronic music apparatus, the storage medium storing content (machine ID embedded content) embedded with licensed machine ID information in a predetermined format, and the licensed machine ID information being indicative of machine IDs (content usage apparatus IDs) of a plurality of electronic music apparatuses licensed for usage of the content. In this storage medium (5R), the licensed machine ID information is embedded in a header part of the content (FIG. 4A) or the licensed machine ID information is embedded in an entity data part of the content as an electronic watermark (FIG. 4B).

In carrying out the invention and according to yet another aspect thereof, there is provided an electronic music apparatus (5; 5a, 5b) having a self machine ID information indicative of a self machine ID (content usage apparatus ID) in which a storage medium stores content (machine ID embedded content) embedded with licensed machine ID information, the electronic music apparatus being accessible to the storage medium (5R) in which the licensed machine ID information being indicative of machine IDs (content usage apparatus IDs) of a plurality of electronic music apparatuses, comprising: a content specifying means (E22, E32) for specifying the storage medium (5R) for retrieving content therefrom desired for use; and a content usage means (E23 through E26, E33 through E51) for, only when a machine ID matching the self machine ID is found included in the machine IDs of the plurality of electronic music apparatuses indicated by the licensed machine ID information embedded in the specified content.

In the electronic music apparatus (5) according to the invention, the content usage means (E23 through E26, E33 through E51) reads the content from the storage medium and loads the content into a RAM only when a machine ID matching the self machine ID is included in the machine IDs of the plurality of electronic music apparatuses indicated by the licensed machine ID information embedded in the specified content (E25) or, if a machine ID matching the self machine ID is not included in the machine IDs of the plurality of electronic music apparatuses indicated by the licensed machine ID information embedded in the specified content (machine ID embedded content), the content usage means adds usage disable information (sounding disable flag) to the specified content and loads the specified content into a RAM (E39).

In the electronic music apparatus according to the invention, if the usage disable information (sounding disable flag) is added to the content (machine ID embedded content) stored in the RAM (E36), the content usage means (E23 through E26, E33 through E51) disables the content from being stored in another storage medium (E43) or, if the usage disable information is added to the content stored in the RAM (E36), the content usage means stores the content in another storage medium (5R) with the usage disable information kept added (E51).

It should be noted that the present invention may also be realized in the form of a computer program.

A content sale site (1) according to the invention embeds, in content to be sold to content purchase apparatuses (5; 5a, 5b), the content usage apparatus IDs for a plurality of electronic music apparatuses licensed for the usage of this content, thereby preventing the content from being used in an unauthorized manner. It should be noted that these content purchase apparatuses may be either electronic music apparatuses capable of using content concerned or apparatuses dedicated to content purchase.

The content sale site (1) holds the licensed machine ID information indicative of a usage licensed apparatus with respect to sold content, so that, if the user fails the downloading of content or accidentally loses the downloaded content, the user can purchase the content again at a low price or purchase the content only for apparatuses to be additionally licensed for content usage for example, thereby realizing a content sale and purchase system intended for user convenience.

At the time of purchasing content, the content purchase apparatuses (5; 5a, 5b) according to the invention notify, at purchase of content, the content sale site (1) of a plurality of electronic music apparatuses to be licensed for content usage, so that the content for the plurality of electronic music apparatuses (including electronic music apparatuses having no capability of communicating with the content sale site) may be collectively purchased by one downloading session. In addition, each machine ID information is automatically acquired from the plurality of electronic music apparatuses (5; 5a, 5b) connected to the content purchase apparatus (5), thereby facilitating user purchase operations.

The recording medium (5R) according to the invention records machine ID embedded content, in which the machine IDs of a plurality of usage licensed electronic music apparatuses are embedded in the header of the content concerned as the licensed machine ID information or into the content itself as an electronic watermark, thereby effectively preventing each usage non-licensed electronic music apparatus from using the content for the purpose of duplication for example.

At the use of machine ID embedded content, the electronic music apparatuses (5; 5a, 5b) controls the usage in accordance with the embedded licensed machine ID information (E23 through E26, E33 through E51) to allow any usage licensed apparatus to use the content and prevent any usage non-licensed apparatus from duplicating the content for example, thereby contributing to the protection of content copyright.

As described and according to the invention, the content usage apparatus IDs of a plurality of licensed electronic music apparatuses (for example, content purchase apparatus or any electronic music apparatuses connectable to content purchase apparatuses) are embedded in content to be sold from a content sale site to a content purchase apparatus (for example an electronic music apparatus accessing the content sale site), thereby prevent the content from being used in an unauthorized manner. In addition, the licensed machine ID information indicative of usage licensed apparatuses is held on the content sale site side, so that if the user fails to download particular content or accidentally loses the downloaded content, the licensed machine ID information may be used to purchase the lost content again at a discount price and purchase content only for additional usage licensed apparatuses for example, thereby realizing a content sale and purchase system intended for enhancing user convenience.

As described and according to the invention, a content sale site (for example, an electronic music apparatus accessible to a content sale site) specifies, at the purchase of content, a plurality of electronic music apparatuses to be usage licensed (for example, content purchase apparatus or any electronic music apparatuses connectable thereto) for a content sale site, thereby allowing the collective purchase of content for a plurality of electronic music apparatuses by a single download operation. Further, the machine ID information is automatically obtained from each of a plurality of electronic music apparatuses connected to a content purchase apparatus, thereby enhancing user purchase operations.

A storage medium according to the invention (a storage medium in which machine ID embedded content is downloaded from a content distribution site via a content purchase apparatus) records machine ID embedded content with the machine IDs of a plurality of usage licensed electronic music apparatuses embedded in the header of the content concerned as licensed machine ID information and as an electronic watermark in the content itself, thereby, by referencing the licensed machine ID information, effectively preventing content from being used on any electronic music apparatus not licensed for usage.

An electronic music apparatus according to the invention (an electronic music apparatus accessible to a storage medium recording machine ID embedded content) controls, at the use of machine ID embedded content recorded in a storage medium, the usage of the content in accordance with the decision of the embedded licensed machine ID information to enable any apparatus licensed for usage to use the content and disable any apparatus not licensed for usage to use the content, thereby contributing to copyright protection.

Now, referring again to FIG. 1, there is shown a schematic network configuration of a content usage system practiced as another embodiment of the invention. In this example, the system comprises a content sale site 1, a wide area communication network 2 such as the Internet, a relay device (router) 3, a local communication network 4 such as LAN, and a plurality of content usage apparatuses (electronic music devices) 5.

Referring again to FIG. 2, there is shown a block diagram illustrating a hardware configuration of each content usage apparatus practiced as this embodiment of the invention. In this example, a dedicated electronic music apparatus such as a sampler is used for the content usage apparatus 5, in which a central processing unit (CPU) 5A, aread-only memory (ROM) 5B, a random access memory (RAM) 5C, an external storage unit 5D, an A/D converter 5E, a detector circuit 5F, a display circuit 5G, a tone generator circuit 5H, an effecter circuit 5J, a communication interface (communication I/F) 5K, and a MIDI interface (MIDI I/F) 5L are interconnected via a bus 5M.

In this embodiment of the present invention, the content to be stored in a storage medium is embedded with a content usage ID in a predetermined format as "licensed machine ID" for identifying one or more licensed content usage apparatuses in order to make the content usable only on the licensed content usage apparatuses (electronic musical apparatuses). FIG. 15 shows a content storage format example according to this embodiment of the present invention. The content supplied from the content sale site to be stored in a storage medium of the content usage apparatus 5 is composed of a header part recording the header data including content name and number and a content entity part recording entity data such as sample waveform data, the licensed machine ID and lending information IL being embedded in the header part or the content entity part in a predetermined format.

Figure 15A:
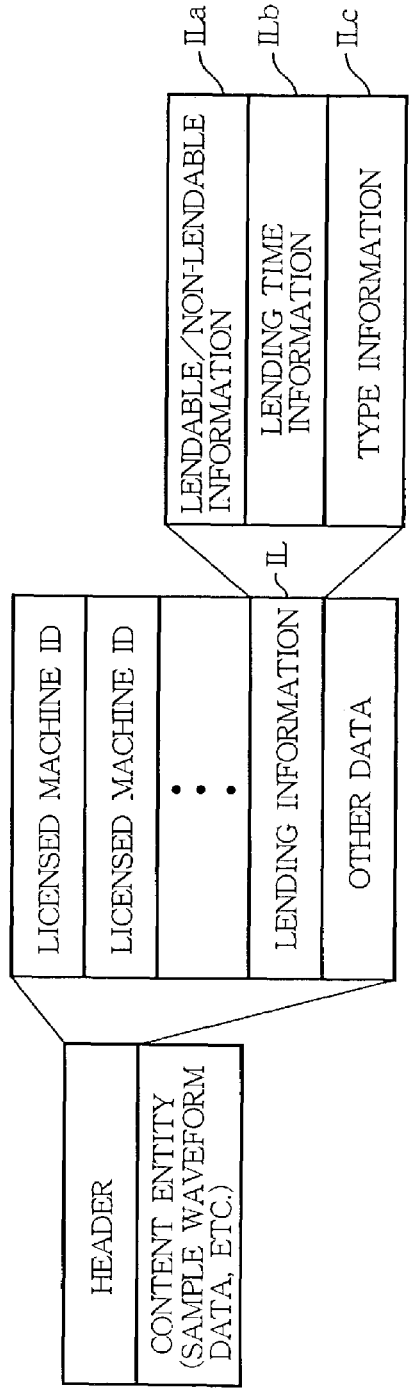
FIGS. 15A and 15B are storage format examples of content to be stored in a recording medium of a content usage apparatus practiced as another embodiment of the invention.

The licensed machine ID is the information which records the content usage apparatus ID for identifying one or more content usage apparatuses ("content usage licensed apparatuses" or simply "licensed apparatuses"). The lending information is composed of lendable/non-lendable information ILa and lending time information ILb, and type information ILc as shown in FIG. 15A.

The lendable/non-lendable information ILa is indicative of whether the content concerned is lendable to a content usage apparatus having no licensed machine ID ("content usage non-licensed apparatus" or simply "non-licensed apparatus"), namely, usable on content usage non-licensed apparatuses. The lendable/non-lendable information is also referred to as "usable/unusable information". The lending time information ILb is indicative of the time limit of content usage at the time when the lendable/non-lendable information ILa is indicative of "lendable". The lending time information ILb is also referred to as "time limit information". Namely, the content in which the lendable/non-lendable information ILa is indicative of "lendable" is available for a temporary use under the time limit indicated by the lending time information ILb even on a non-licensed apparatus.

The type information ILc is indicative of whether the content concerned is authorized content ("authorized") or content lent from another content usage apparatus ("lend"). The type information is also referred to as "authorized/lend information". For the content initially purchased by downloading from the content sale site 1, the type information ILc is set to "authorized" (namely, authorized content).

Figure 15B:
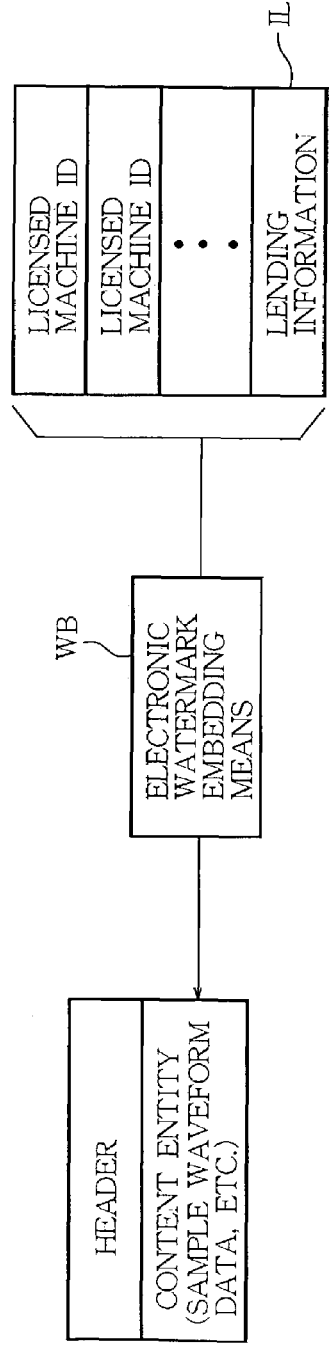

The licensed machine ID is embedded in content in any of the following methods:
1. the licensed machine ID is embedded directly into the header part of content;
2. a predetermined computation is performed on the licensed machine ID and the resultant ID is embedded into the header part of content;
3. the licensed machine ID is embedded by an electronic watermark embedding means WB into the entity part of content as an electronic watermark (FIG. 15B); and
4. a predetermined computation is performed on the licensed machine ID and the resultant ID is embedded by the electronic watermark embedding means WB into the entity part of content as an electronic watermark (FIG. 15B).

In a format example (1) shown in FIG. 15A, the above-mentioned licensed machine ID and lending information IL are embedded in the header part and the header data indicative of the name and number of content are recorded to the header part as "other data". In a format example (2) shown in FIG. 15B, header data are recorded to the header part and a plurality of licensed machine IDs and lending information IL of the content concerned are embedded in the content entity part by the electronic watermark embedding means as an electronic watermark (it should be noted that the contents of the lending information IL are the same as those shown on the right side in FIG. 15A).

(Operation Flow of Content Usage)

Figure 16:
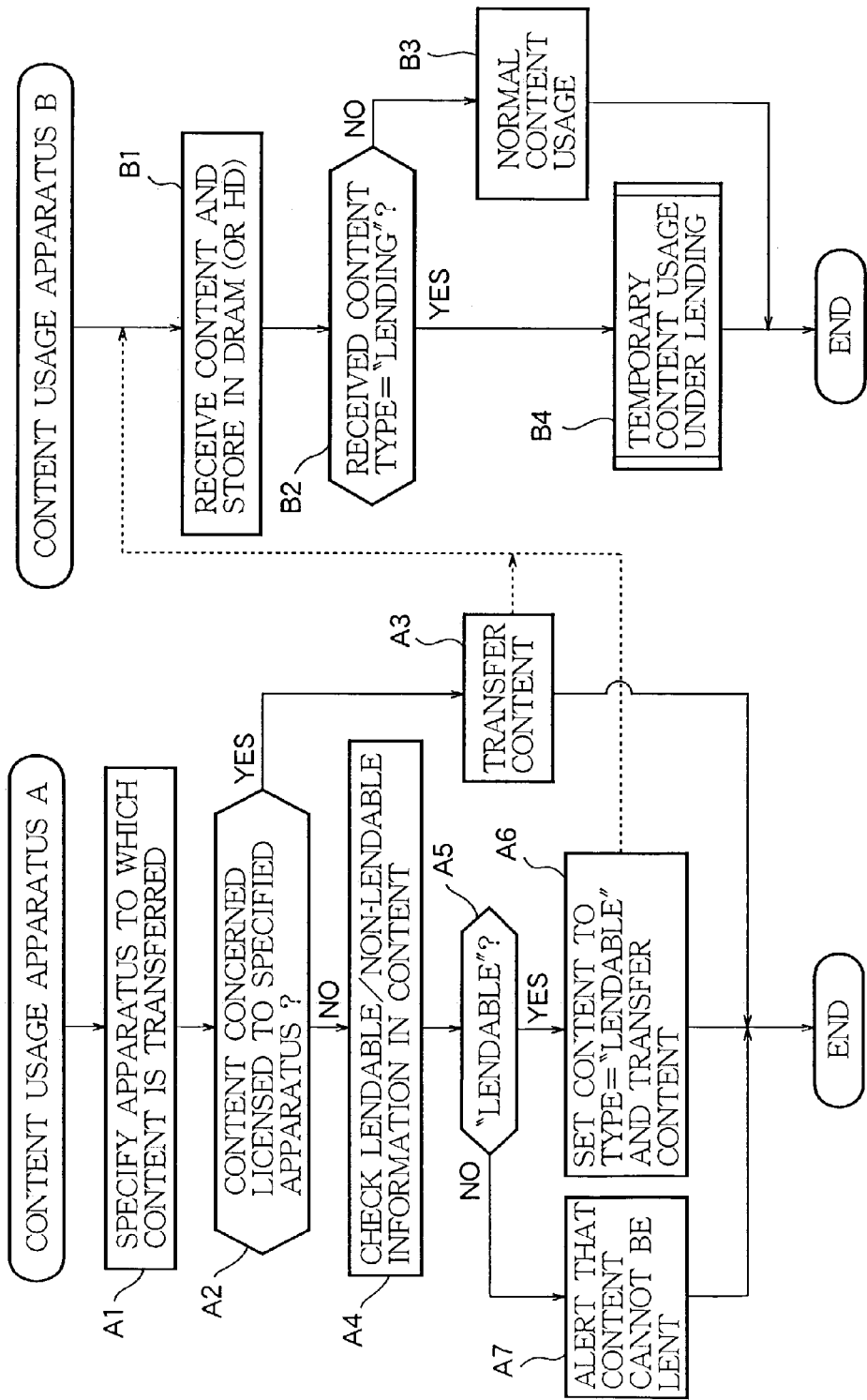
FIG. 16 is a flowchart indicative of operation of the content usage system practiced as another embodiment of the invention.
Figure 17:
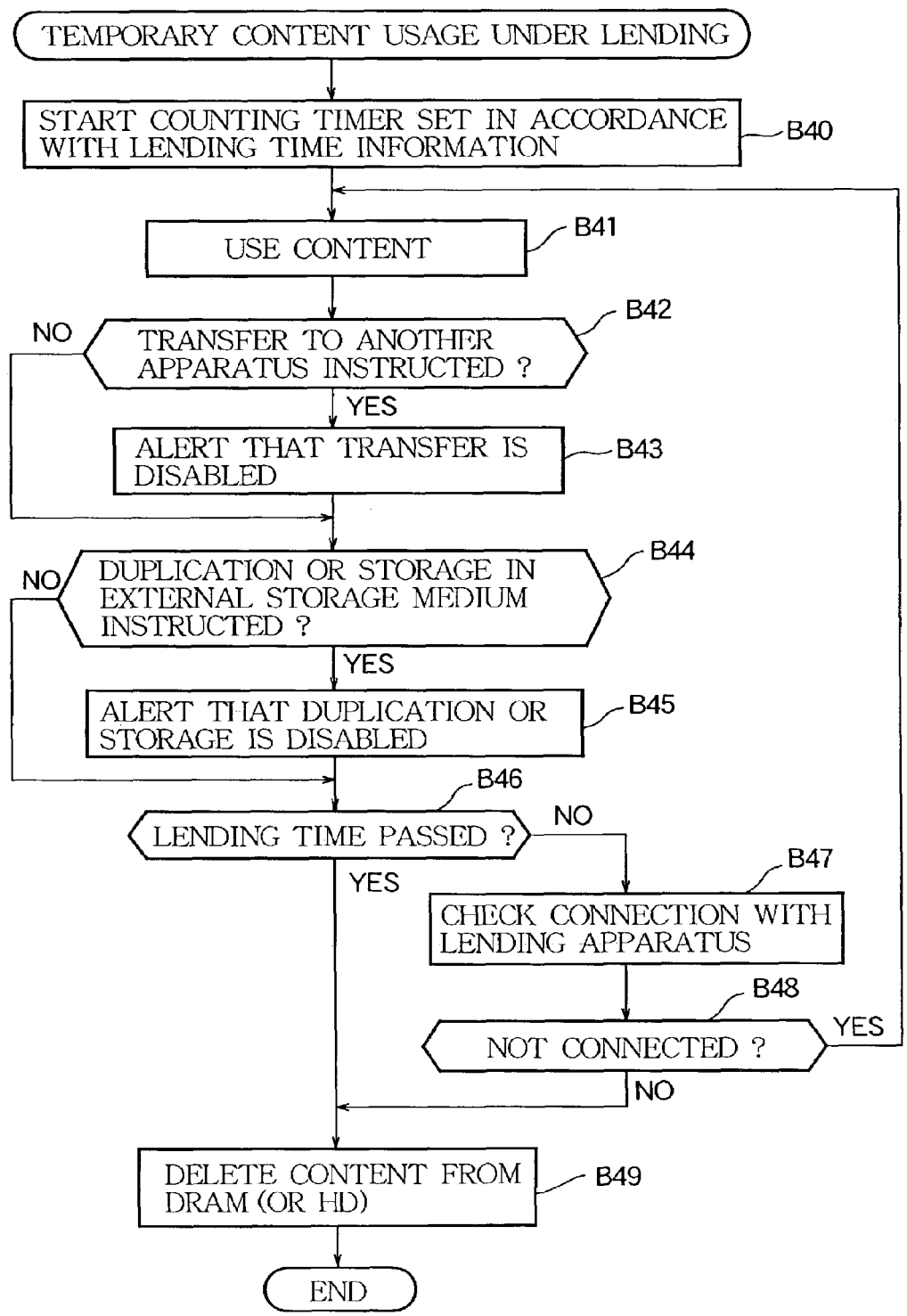
FIG. 17 is a flowchart indicative of an operation example of "temporary content usage under lending" on the content usage system practiced as one embodiment of the invention.

FIGS. 16 and 17 are flowcharts indicative of exemplary operations of content usage to be executed in the content usage system practiced as another embodiment of the present invention. The following outlines the usage of content in the present invention with reference to FIG. 16. The content usage system according to the present invention handles content that includes the licensed machine ID and the lending information IL formed by lendable/non-lendable information ILa, time information ILb and type (authorized/lend) information ILc. To use the content held in a content usage licensed apparatus A by a content usage licensed apparatus B, the machine ID of the apparatus B is obtained (A1) and the obtained machine ID is compared with the licensed machine ID of the content (A2). If a match is found between these machine IDs (A2->YES), then the content may be used on the content usage apparatus concerned (B) without restriction. (A3->B3). If no match is found between these machine IDs (A2->NO), then the content is transferred to the content usage apparatus (B) with the type information ILc set to "lendable" only when the lendable/non-lendable information ILa is indicative of "lendable", thereby making this content usable within the time limit indicated by the time information ILb (A6->B4).

The following describes the operation of this content usage system in a specific manner with reference to the examples of operation flows shown in FIG. 17 and on. If the content usage apparatus A has the licensed machine ID for certain content and is licensed for the usage of this content and if the content usage apparatus A transfers this content to another given content, the content usage apparatus B, then this system operates as follows.

The content usage apparatus A gets the machine ID of the content usage apparatus B to which the content concerned is to be transferred and specifies the content usage apparatus B as the transfer destination of the content concerned (step A1). The content concerned is determined whether it is not licensed on the content usage apparatus B, the transfer destination (step A2). Namely, it is determined whether the machine ID of the content usage apparatus B is included in the licensed machine IDs of the content concerned.

If the machine ID of the content usage apparatus B is found matching the licensed machine ID of the content concerned and the content usage apparatus B is found a licensed apparatus (A2->YES), then the processing of transferring the content concerned to the content usage apparatus B is performed and then the operation of the content usage apparatus A ends. Namely, if the content usage apparatus B is found a licensed apparatus, the content concerned is directly transferred to the apparatus B and made usage thereon without restriction as will be described later (B3).

On the other hand, if the content usage apparatus B is found a content usage non-licensed apparatus which has no machine ID matching the licensed machine ID of the content concerned (A2->NO), the lendable/non-lendable information ILa included in the content concerned is checked (step A4) to see if the lendable/non-lendable information ILa is indicative of "lendable" (step A5).

If the lendable/non-lendable information ILa is found "lendable" (A5->YES), then the type information ILc of the content concerned is reset from "authorized" to "lend" and the resultant type information is transferred to the content usage apparatus B (step A6) and then the operation of the content usage apparatus A ends. Namely, if the content usage apparatus B is a non-licensed apparatus, the type information ILb of the content concerned is set to "lend" to make it usable on the apparatus B with a time limit based on the lend time information ILb (B4).

On the other hand, if the lendable/non-lendable information ILa is indicative of "lendable" (A4->NO), then the user of the content usage apparatus A is alerted via the screen display on the display (5R) or a sounding means that the content concerned is "non-lendable" (step A7) and then the operation of the content usage apparatus A ends. Namely, if the lendable/non-lendable information ILa="non-lendable", the content concerned is not usable on the content usage apparatus B.

If the content has been transferred from the content usage apparatus A to the content usage apparatus B (A3, A6), the content usage apparatus B receives the transferred content and stores it in the DRAM (5C) or the HD (5D) (step B1). Next, the type information of the received content is checked if it is indicative of "lend". If the type information="authorized" (B2->NO), the content concerned may be used without restriction (the time limit of the lending time information ILb is not considered) in an ordinary manner (step B3) and, when the use of the content has been completed, the operation of the content usage apparatus B ends.

On the other hand, if the type information of the received content="lend" (B2->YES), the operation for "temporary content usage under lending" is performed (step B4), in which the content concerned may be used with the time limit specified in the lending time information ILb. When this "temporary content usage under lending" ends, the operation of the content usage apparatus B ends.

Referring to FIG. 17, there is shown a detailed operation flow of "temporary content usage under lending". In "temporary content usage under lending (step B4), first the timer (5N) is set in accordance with the lending time information ILb at the time when the reception of content starts or ends, thereby starting counting the content usage time (step B40). Once the timer counting starts, the content becomes usable (step B41). For example, if the content usage apparatus is a sampler and the apparatus A is running short of sounding channels or parts, their sounding processing is executed by the apparatus B.

However, the above-mentioned content usage does not include the transfer of the content concerned to another usage apparatus, the duplication of the content concerned, and the storage thereof into the external storage medium (5D) for example. Namely, it is determined whether an instruction for transferring to another content usage apparatus has been issued (step B42) and, if this instruction is found issued (B42->YES), the user of the content usage apparatus B is alerted through the display (5R) or a sounding means that the content concerned cannot be transferred (step B43). After this alert is given or if there is found no transfer instruction (B42->NO), it is determined whether there is an instruction for duplication or storage (step B44). If the instruction for duplication or storage is found issued (B44->YES), the user is alerted in the same manner that duplication or storage cannot be performed (step B45).

Next, after the alert against duplication or storage or if there is no instruction for duplication or storage (B44->NO), it is determined by means of the timer (5N) whether the lending time set on the basis of the lending time information ILb has passed (step B46). If the lending time is found not passed, the connection with the content usage apparatus A, the lender of the content concerned, is checked (step B47) to see if the content usage apparatus B is currently in connection with the content usage apparatus A (via a cable directly, in a wireless manner, or via the local communication network 4 for example) (step B48).

If the connection with the lending apparatus A is found established (B48->YES), then, while the lending time has not passed (B46=NO), the operation associated with content usage, transfer, duplication, or storage is continued (B41 to B46). If the connection with the lending apparatus A is invalidated (B48->NO), then the content concerned is deleted from the DRAM (5C) or the HD (5D), upon which "temporary content usage under lending" ends.

If the connection with the lending apparatus A is maintained (B48=YES), the content concerned is deleted from the DRAM (or HD) upon passing of the lending time and then "temporary content usage under lending" ends.

(Various Other Modifications)

In the above, the present invention has been described with reference to one embodiment thereof. It will be apparent that the present invention may be practiced in various other modifications. For example, the purchase of and charging for the use of content have not been described in detail in the above-mentioned embodiment. In the sale of content including lending information from the content sale site 1 to the content usage apparatus 5 for example, the user of the content usage apparatus is obviously charged for the usage fee. In such a fee charging, the pricing may be changed depending on whether the sold content is lendable (the lendable/non-lendable information="lendable") or non-lendable (the lendable/non-lendable information="non-lendable"). In addition, the pricing may be changed depending on the length of content lending (the time limit length indicated by the time information).

The transfer of obtained content may be instructed not only in a manner that, as with the above-mentioned embodiment, the content is transferred from a content usage licensed apparatus with its machine ID included in licensed machine IDs to a content usage non-licensed apparatus with its machine ID not included in licensed machine IDs, but also in a manner that a content usage non-licensed apparatus requests a content usage licensed apparatus for the content.

The content obtained at a content usage licensed apparatus may be transferred to another content usage apparatus not only via a communication network such as LAN as with the above-mentioned embodiment, but also via a storage medium for use. In this case, the time at which the content storage occurred may be recorded along with the content itself and the time limit specified in the time information may be counted by the timer starting from the recorded content storage time. Alternatively, the timer counting may be started from the time at which content has been read from another content usage apparatus.

In the above-mentioned embodiment, content may be lent for use only when connection is established between the content lending apparatus (A) and the content lent apparatus (B). It will be apparent that content may be lent for use between content usage apparatuses which are not interconnected as long as the lending time has not been expired.

For summary, in carrying out the invention and according to the other aspect thereof, there is provided a content usage system comprising: a apparatus information retrieving means (A1) for retrieving a machine ID of a content usage apparatus (B) which wants to use content; a detecting means (A2, A5, B40) for detecting a usage licensed machine ID (licensed machine ID) from the content; a comparing means (A2) for comparing the detected usage licensed machine ID with the retrieved machine ID; and a usage determining means (A3, B3; a4 through A6, B4) for, if there is a match between the machine ID and the usage licensed machine ID (A2->YES), making the content usable without restriction on the content usage apparatus (B) (A7->B3) and, if there is a no match between the machine ID and the usage licensed machine ID (A2->NO), making the content usable with a time limit on the content usage apparatus (B) (A3->A6->B4=B40 through B49). It should be noted that each notation enclosed in parentheses denotes a reference numeral or terminology used in the embodiments to be described later, which holds the same in the following description.

In the above-mentioned content usage system, the detecting means (A2, A5, B40) detects time limit information (ILb) from the content (B40) and the usage determining means (A3, B3; A5 through A6, B3), if there is no match between both IDs (A2->NO), makes the content usable within a time limit indicated by the time limit information (ILb) (A6, B4) In the above-mentioned content usage system, the detecting means (A2, A5, B40) detects, from the content, usable/unusable information (ILa) indicative of whether the content is usable or unusable on a content usage apparatus having no usage licensed machine ID and the usage determining means (A3, B3; A4 through A6, B4) makes the content usable with time limit only when there is no match between both IDs (A2->NO) and the usable/unusable information indicates usable (A6, B4).

In the above-mentioned content usage system, the usage determining means (A3, B3; A4 through A6, B4) has a disabling means (B42 through B45) for disabling the content usable with a time limit (A6) to be duplicated, stored in a recording medium, or transferred to a content usage apparatus other than the content usage apparatus.

In carrying out the invention and according to another aspect thereof, there is provided a content usage apparatus (A) comprising: a transfer destination specifying means (A1) for specifying a content usage apparatus (B) to which content is transferred; a detecting means (A2) for detecting licensed apparatus specifying information (licensed machine ID) from the content; a writing means (A6) for, if apparatus information (machine ID) for identifying the content usage apparatus (B) specified as transfer destination is not included in the licensed apparatus specifying information (A2->NO), writing lending information (ILc) indicative that the content may be used with a predetermined limitation into the content; and a transferring means (A6) for transferring the content written with the lending information (ILc) to the content usage apparatus (B) specified as transfer destination In carrying out the invention and according to still another aspect thereof, there is provided a content usage apparatus (A) comprising: a transfer destination specifying means (A1) for specifying a content usage apparatus (b) to which content is transferred; a detecting means (A2) for detecting, from the content, usable/unusable information (ILa) having a usage licensed machine ID and a usage time limit; and a transferring means (A6) for transferring the content to the content usage apparatus (B) specified as transfer destination only when a machine ID of the content usage apparatus (B) specified as transfer destination is not included in the usage licensed machine ID (A2->NO) and the usable/unusable information (ILa) is indicative of usable (A5->YES).

In carrying out the invention and according to yet another aspect thereof, there is provided a content usage apparatus (content usage apparatus B with "A2->NO") comprising: a content retrieving means (B40) for retrieving content from another content usage apparatus (A) licensed with content usage; a detecting means (B40) for detecting usable/unusable information (ILa) from the retrieved content; a connection confirming means (B47) for checking a connection with the another content usage apparatus (A) on the basis of the detection of the usable/unusable information (ILa); and a usage determining means (B48->B41) for making the content usable only while the connection with the another content usage licensed apparatus (A) is confirmed by the connection confirming means.

In carrying out the invention and according to a different aspect thereof, there is provided a content recording medium recording: a content entity; a usage licensed machine ID (licensed machine ID) for identifying a content usage apparatus on which content is usable; and usable/unusable information (ILa) indicative whether the content is usable or unusable with a time limit on a content usage apparatus not having the usage licensed machine ID (claim 8) and a content recording medium recording: a content entity; a usage licensed machine ID (licensed machine ID) for identifying a content usage apparatus on which content is usable; and time limit information (ILb) associated with content usage with a time limit on a content usage apparatus not having the usage licensed machine ID.

According to the content usage system according to the invention, only the content usage apparatus (A2->YES) licensed for the usage of the content concerned having a machine ID matching the usage licensed machine ID included in the content can use the content (A3) in a normal manner, thereby preventing unauthorized usage of the content from occurring. In addition, even a content usage non-licensed apparatus (content usage apparatus B with "A2->NO") having no ID matching the usage licensed machine ID and therefore not licensed for content usage may usage the content concerned (A6) in a temporary manner (B4). For example, in a content usage apparatus1 such as a sampler, if the content usage licensed apparatus (A) is running short of the number of simultaneous soundings or parts of content (waveform data), these shortages may be temporarily compensated by the content usage non-licensed apparatus.

In the above-mentioned content usage system, time limit information (ILb) is arranged in content in response to the above-mentioned time-limited content usage, thereby making the content usable with the time limit indicated by the time limit information (ILb) (B41 through B49).

In the above-mentioned content usage system, usable/unusable information (ILa) indicative of whether time-limited content usage is enabled on a content usage apparatus having no usage licensed machine ID is arranged in content in response to the above-mentioned time-limited content usage, so that the content may be used with a time limit only when the usable/unusable information (ILa) is indicative of usable (A5->YES) (B41 through B49).

In the above-mentioned content usage system, the means (B42 through B45) for disabling the duplication, storage, and transfer of content disables the duplication of content, the storage thereof, or the transfer thereof to another content usage apparatus if the content is used with a time limit (A6).

In the content usage apparatus (A) according to the invention, content is transferred for lending to a content usage non-licensed apparatus with apparatus information not included in licensed apparatus specifying information (content usage apparatus B with "A2->NO"), in which the content is manipulated to indicate that the content is the content to be lent (writing of lending information). Consequently, the content is transferred from a content usage licensed apparatus (A) to a content usage non-licensed apparatus to be lent with a predetermined restriction and the content usage non-licensed apparatus which has received this content can identify that this content is for rent and use it accordingly.

In the content usage apparatus (A) according to the invention, content may be transferred to a content usage non-licensed apparatus of which machine ID does not match the content usage licensed machine ID (the content usage apparatus B with "A2->NO") only when "usable/unusable information (ILa) indicative of whether content usage with a time limit is "usable" included in the content is indicative of "usable". Consequently, content transfer is enabled only when the content is "lendable" in transferring the content from the content usage licensed apparatus (A) to a content usage non-licensed apparatus, thereby preventing non-lendable content from being erroneously lent to any content usage non-licensed apparatus.

In the content usage apparatus according to the invention, when content is lent from a content usage licensed apparatus to a content usage non-licensed apparatus (content usage apparatus B with "A2->NO"), this content usage non-licensed apparatus checks the connection with the content usage licensed apparatus (A) and the lent content is usable only while the connection with the content usage licensed apparatus (A) is established, thereby restricting the content lending to a period of time in which the content usage licensed apparatus (A) is in use.

A content recording medium according to the invention includes a content entity, a usage licensed machine ID, and usable/unusable information (ILa), thereby indicating on the basis of the usable/unusable information (ILa) whether the content usage with a time limit is enabled on a content usage non-licensed apparatus (content usage apparatus B with "A2->NO") having no usage licensed machine ID. Consequently, in the content usage apparatuses (A, B), the usable/unusable information (ILa) of the content stored in this content recording medium is referenced to make the lendable content usable with a time limit and prevent the non-lendable content from being erroneously lent to any content usage non-licensed apparatus.

A content recording medium according to the invention includes a usage license ID and time limit information (ILb) along with a content entity, the time limit information (ILb) being indicative of a time limit for the usage of content with a time limit on a content usage non-licensed apparatus having no usage licensed machine ID (content usage apparatus B with "A2->NO"). Consequently, the content usage non-licensed apparatus may use content stored in this content recording medium within a time limit specified by the usage time information (ILb).

As described and according to the invention, a usage licensed machine ID (licensed machine ID) is included in content and a content usage apparatus (B) may use the content without restriction if its machine ID matches the usage licensed machine ID or may use the content with time limit if its ID does not match the usage licensed machine ID. Consequently, content may be normally used only on content usage licensed apparatuses, thereby preventing unauthorized use from happening. Further, even content usage non-licensed apparatuses may use content only temporarily. In this case, content may be used only within the time limit specified in the time limit information (ILb) contained in the content. Still further, content may be used with time limit only when the usable/unusable information (ILa) included in the content is indicative of "usable". Yet further, when content is used with time limit, the duplication of the content, the storage of the content into a recording medium, or the transfer of the content to another content usage apparatus may be disabled.

According to the present invention, content is transferred for lending from a content usage licensed apparatus (A) to a content usage non-licensed apparatus (B), in which the content is manipulated to indicate that the content is for lending, so that the content may be lent from the content usage licensed apparatus (A) to the content usage non-licensed apparatus (B) with certain limitations and the content usage non-licensed apparatus to which the content is lent may use the content by identifying this content as lent content.

According to the present invention, for a content usage non-licensed apparatus having the machine ID non-matching the content usage licensed machine ID, the usable/unusable information (ILa) indicative of whether time-limited content is usable or not is included in content and, when lending the content from the content usage licensed apparatus (A), the content may be transferred only when the usable/unusable information (ILa) permits that the content is usable, thereby preventing non-lendable content from being erroneously lent to a content usage non-licensed apparatus by assuming that the content may be transferred only when it is "lendable" when lending it from the content usage licensed apparatus (A) to the content usage non-licensed apparatus.

According to the present invention, when content is lent from a content usage licensed apparatus (A) to a content usage non-licensed apparatus, this content usage non-licensed apparatus checks the connection with the content usage licensed apparatus (A) and the content may be used only while the connection with the content usage licensed apparatus (A) is established, so that the content lending may be limited to a duration of time in which the content usage licensed apparatus is in use by assuming that the content may be used only during a duration of time in which the content usage non-licensed apparatus to which the content has been lent is connected to the content usage licensed apparatus (A).

According to the present invention, content including usage licensed machine ID and usable/unusable information (ILa) is stored in a recording medium and whether or not the content is usable with time limit on a content usage non-licensed apparatus is indicated by the usable/unusable information (ILa), so that the content usage apparatuses (A, B) may reference the content usable/unusable information (ILa) stored in this content recording medium to use the non-lendable content with time limit, thereby preventing the non-lendable content from being erroneously lent to a content usage non-licensed apparatus.

According to the present invention, content including usage licensed machine ID and time limit information (ILb) is stored in a recording medium and the time limit for the use of the content with time limit on a content usage non-licensed apparatus is indicated by the usable/unusable information (ILb). Consequently, the content usage non-licensed apparatus may use the content stored in this content recording medium within the time limit indicated by the time limit information (ILb).

What is claimed is:

1. A server apparatus operating a content sale site for selling a digital content and connecting communicably via a communication network to a client apparatus which may purchase a digital content for use in an electronic music apparatus, the server apparatus comprising:

a communicating section communicable with the client apparatus for receiving therefrom order information specifying a digital content to be purchased, and machine ID information designating machine IDs of electronic music apparatuses which are intended to use the specified digital content;

a licensing section that embeds the received machine ID information in the digital content specified by the client apparatus so as to license the specified digital content to the electronic music apparatuses designated by the client apparatus;

a providing section that provides the digital content embedded with the machine ID information to the client apparatus such that the provided digital content is made available exclusively by the designated electronic musical apparatuses according to the embedded machine ID information;

a charging section that charges the client apparatus for the specified digital content provided to the client apparatus; and a registering section that registers the embedded machine ID information in connection with the specified digital content, wherein the communicating section receives from the client apparatus new order information specifying the same digital content accompanied by new machine ID information designating machine IDs, wherein the charging section compares the machine ID contained in the new machine ID information with the machine IDs contained in the registered machine ID information to determine whether the machine IDs contained in the new machine ID information overlap with the machine IDs contained in the registered machine ID information, wherein the charging section reduces a charge to the client apparatus in response to determining that the machine IDs contained in the new machine ID information overlap with the machine IDs contained in the registered machine ID information, and wherein the charging section subtracts an amount already charged in association with the registered machine ID information from a charge computed for the new order information.

2. The server apparatus according to claim 1, wherein the communicating section notifies the client apparatus of a repeat order when the client apparatus sends new order information specifying the same digital content accompanied by new machine ID information designating machine IDs and when the machine IDs contained in the new machine ID information overlap with the machine IDs contained in the registered machine ID information.

3. A computer-readable medium containing a program for use in a server apparatus operating a content sale site for selling a digital content and being communicably connected via a communication network to a client apparatus which may purchase a digital content for use in an electronic music apparatus, the program being executable by the server apparatus for causing the content sale site to perform a method comprising the steps of:

communicating with the client apparatus to receive therefrom order information specifying a digital content to be purchased, and machine ID information designating machine IDs of electronic music apparatuses which are intended to use the specified digital content;

embedding the received machine ID information in the digital content specified by the client apparatus so as to license the specified digital content to the electronic music apparatuses designated by the client apparatus;

providing the digital content embedded with the machine ID information to the client apparatus such that the provided digital content is made available exclusively by the designated electronic musical apparatuses according to the embedded machine ID information;

charging the client apparatus for the specified digital content provided to the client apparatus; and registering the embedded machine ID information in connection with the specified digital content, communicating with the client apparatus to receive therefrom new order information specifying the same digital content accompanied by new machine ID information designating machine IDs, wherein the charging step includes comparing the machine ID contained in the new machine ID information with the machine IDs contained in the registered machine ID information to determine whether the machine IDs contained in the new machine ID information overlap with the machine IDs contained in the registered machine ID information, wherein the charging step includes reducing a charge to the client apparatus in response to determining that the machine IDs contained in the new machine ID information overlap with the machine IDs contained in the registered machine ID information, and wherein the charging step includes subtracting an amount already charged in association with the registered machine ID information from a charge computed for the new order information.

4. A network system comprising:

a server apparatus operating a content sale site for selling digital content; and a client apparatus operatively coupled to the server apparatus via a communication network for purchasing digital content to be used in an electronic music apparatus, said server apparatus comprising:

a communication section communicable with the client apparatus that receives therefrom order information specifying a digital content to be purchased, and machine ID information designating machine IDs of at least one electronic music apparatus usable with the digital content;

a licensing section that embeds the received machine ID information in the digital content specified by the client apparatus so as to license the specified digital content to the electronic music apparatuses designated by the client apparatus;

a providing section that provides the digital content embedded with the machine ID information to the client apparatus such that the provided digital content is made available exclusively by the designated electronic musical apparatuses according to the embedded machine ID information;

a charging section that charges the client apparatus for the specified digital content provided to the client apparatus; and a registering section that registers the embedded machine ID information in connection with the specified digital content, wherein the communicating section receives from the client apparatus new order information specifying the same digital content accompanied by new machine ID information designating machine IDs, wherein the charging section compares the machine ID contained in the new machine ID information with the machine IDs contained in the registered machine ID information to determine whether the machine IDs contained in the new machine ID information overlap with the machine IDs contained in the registered machine ID information, wherein the charging section reduces a charge to the client apparatus in response to determining that the machine IDs contained in the new machine ID information overlap with the machine IDs contained in the registered machine ID information, and wherein the charging section subtracts an amount already charged in association with the registered machine ID information from a charge computed for the new order information.

* * * * *